(12) United States Patent
Matsuoka

(10) Patent No.: US 8,207,970 B2
(45) Date of Patent: Jun. 26, 2012

(54) STORAGE MEDIUM STORING OBJECT CONTROL PROGRAM AND INFORMATION PROCESSING APPARATUS

(75) Inventor: Hirofumi Matsuoka, Chuo-ku (JP)

(73) Assignee: Nintendo Co., Ltd., Kyoto (JP)

( * ) Notice: Subject to any disclaimer, the term of this patent is extended or adjusted under 35 U.S.C. 154(b) by 735 days.

(21) Appl. No.: 11/493,037

(22) Filed: Jul. 26, 2006

(65) Prior Publication Data

US 2007/0024597 A1 Feb. 1, 2007

(30) Foreign Application Priority Data

Jul. 26, 2005 (JP) .................................. 2005-216278

(51) Int. Cl.
*G06T 13/00* (2011.01)
*G06F 3/033* (2006.01)
*G09G 5/08* (2006.01)

(52) U.S. Cl. ........ 345/473; 345/157; 345/179; 345/474; 345/475

(58) Field of Classification Search .................. 345/473, 345/474, 475, 157, 179
See application file for complete search history.

(56) References Cited

U.S. PATENT DOCUMENTS

| 5,511,983 | A | * | 4/1996 | Kashii et al. ................. | 434/365 |
|---|---|---|---|---|---|
| 5,617,117 | A | * | 4/1997 | Kataoka et al. ............... | 345/157 |
| 5,900,877 | A | * | 5/1999 | Weiss et al. ................... | 715/803 |
| 6,590,568 | B1 | * | 7/2003 | Astala et al. .................. | 345/173 |
| 6,664,965 | B1 | * | 12/2003 | Yamamoto et al. ........... | 345/473 |
| 6,874,126 | B1 | * | 3/2005 | Lapidous ...................... | 715/711 |
| 7,248,270 | B1 | * | 7/2007 | Boylan .......................... | 345/679 |
| 2003/0034439 | A1 | * | 2/2003 | Reime et al. .................. | 250/221 |
| 2003/0034961 | A1 | * | 2/2003 | Kao ............................... | 345/179 |
| 2003/0197744 | A1 | * | 10/2003 | Irvine ............................ | 345/856 |
| 2003/0214491 | A1 | * | 11/2003 | Keely et al. ................... | 345/179 |
| 2004/0021663 | A1 | * | 2/2004 | Suzuki et al. ................. | 345/419 |
| 2004/0164956 | A1 | * | 8/2004 | Yamaguchi et al. .......... | 345/156 |
| 2004/0196267 | A1 | * | 10/2004 | Kawai et al. .................. | 345/173 |
| 2005/0130738 | A1 | * | 6/2005 | Miyamoto et al. ............ | 463/30 |

(Continued)

FOREIGN PATENT DOCUMENTS

JP 4-333912 11/1992

(Continued)

OTHER PUBLICATIONS

R. Sakaguchi et al., "Visual Basic 6.0 Application Development and Programming: The Definitive Edition", p. 48-53, Kyoritsu Shuppan Co., Ltd., Jun. 20, 2000.

*Primary Examiner* — David T Welch
(74) *Attorney, Agent, or Firm* — Nixon & Vanderhye P.C.

(57) ABSTRACT

An information processing apparatus includes, for example, a touch panel placed over a display screen. For example, when a start of a touch input is detected, the first-touch-input coordinates are determined as object generation coordinates and an object is displayed in the coordinates. When an input direction based on coordinates continuously detected after the object generation coordinates until, for example, a touch-off is determined to be a predetermined direction, the object is moved in a specific direction. Alternatively, an input direction is determined based on coordinates continuously detected after the object generation coordinates until a touch-off, and then, based on the input direction, the direction opposite to the input direction, for example, is determined to be a moving direction and the object is moved in the moving direction.

38 Claims, 25 Drawing Sheets

U.S. PATENT DOCUMENTS

2005/0168449 A1* 8/2005 Katayose .................. 345/173
2008/0225007 A1* 9/2008 Nakadaira et al. ............ 345/173

FOREIGN PATENT DOCUMENTS

| | | |
|---|---|---|
| JP | 5-31256 | 2/1993 |
| JP | 2827612 | 9/1998 |
| JP | 2001-297258 | 10/2001 |
| JP | 2002-328040 | 11/2002 |
| JP | 2004-70492 | 3/2004 |
| JP | 2005-32015 | 2/2005 |
| JP | 2005-92472 | 4/2005 |
| JP | 2005-193006 | 7/2005 |

* cited by examiner

FIG. 3
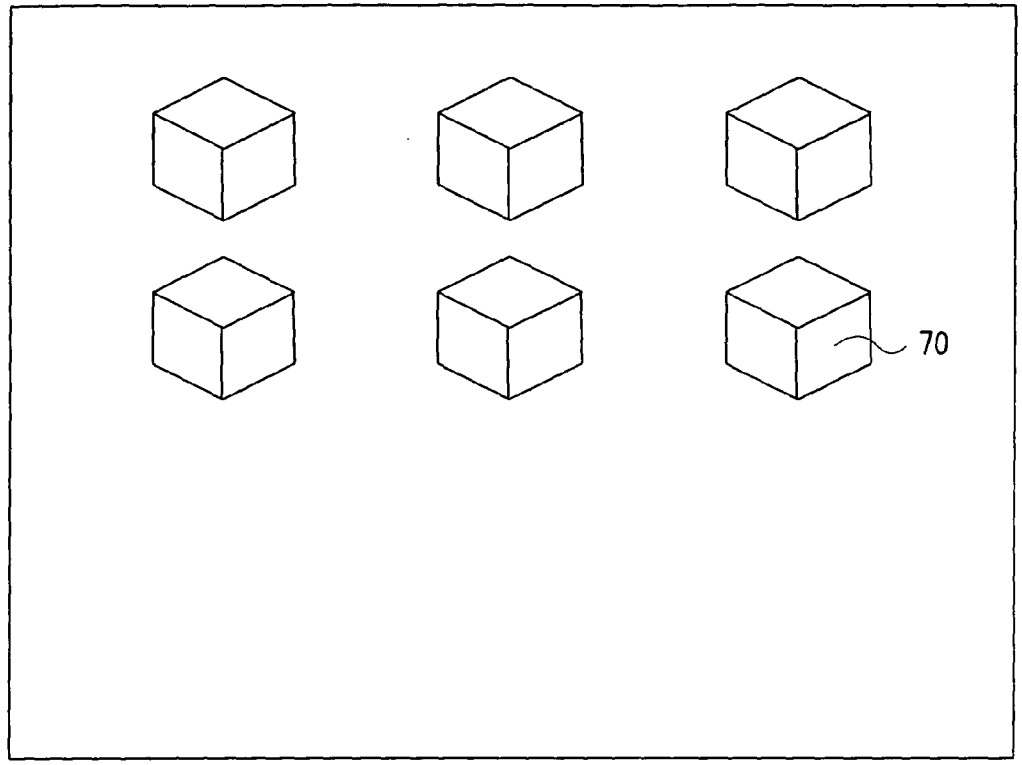
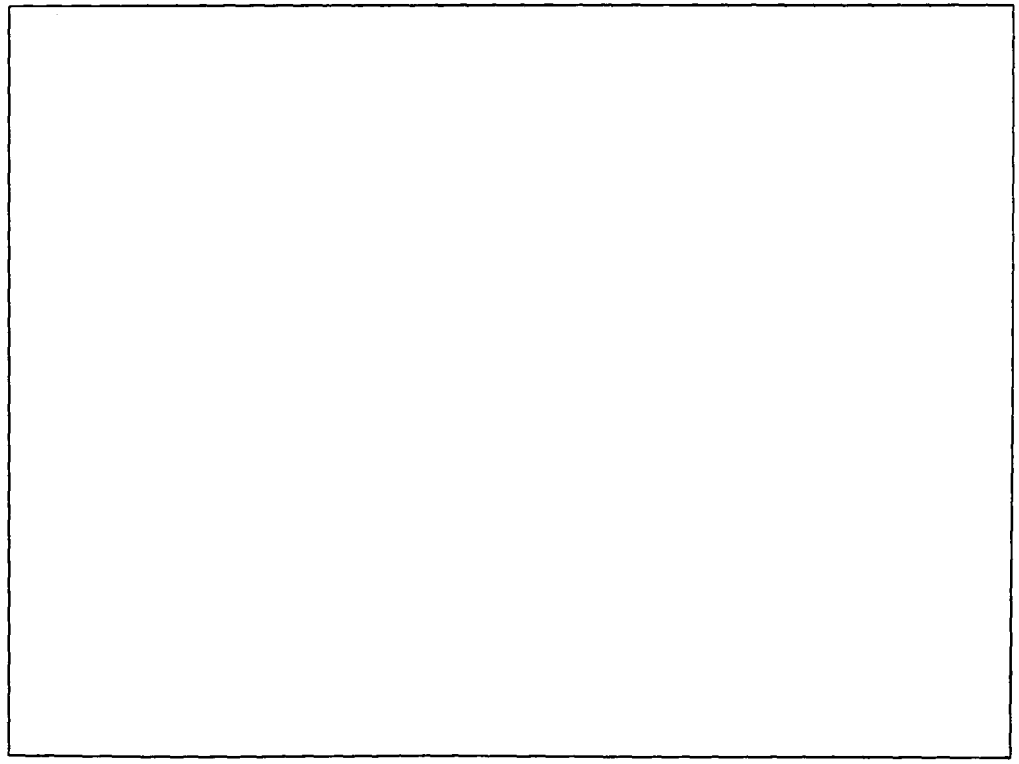

FIG. 4
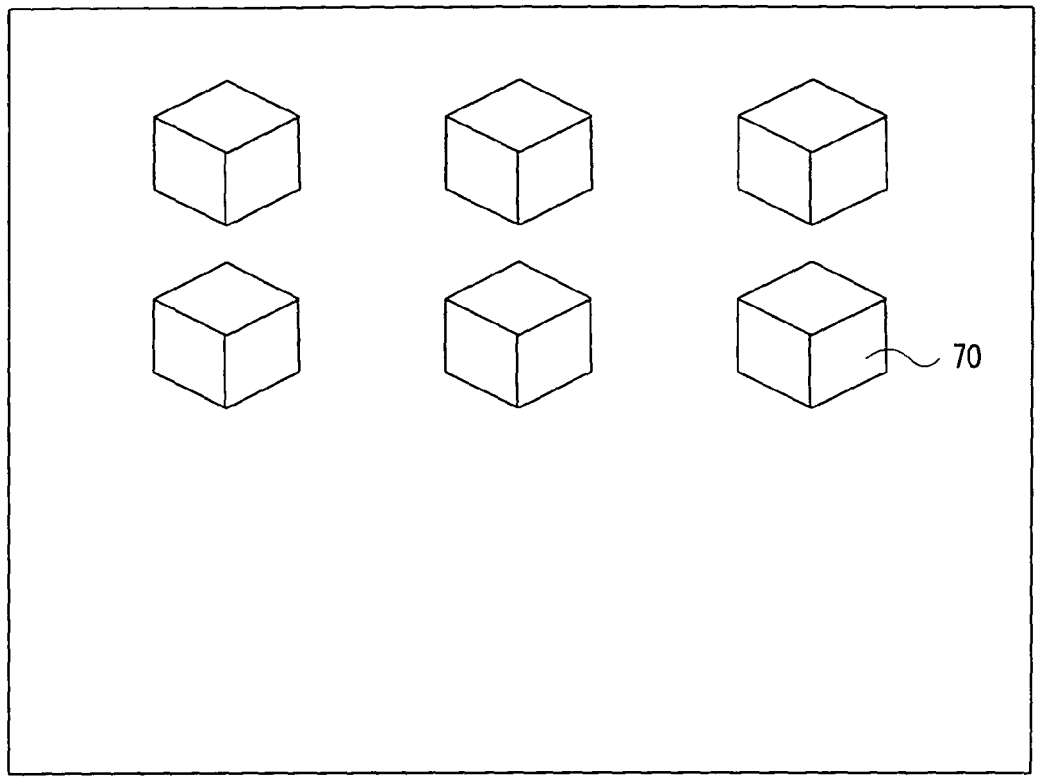
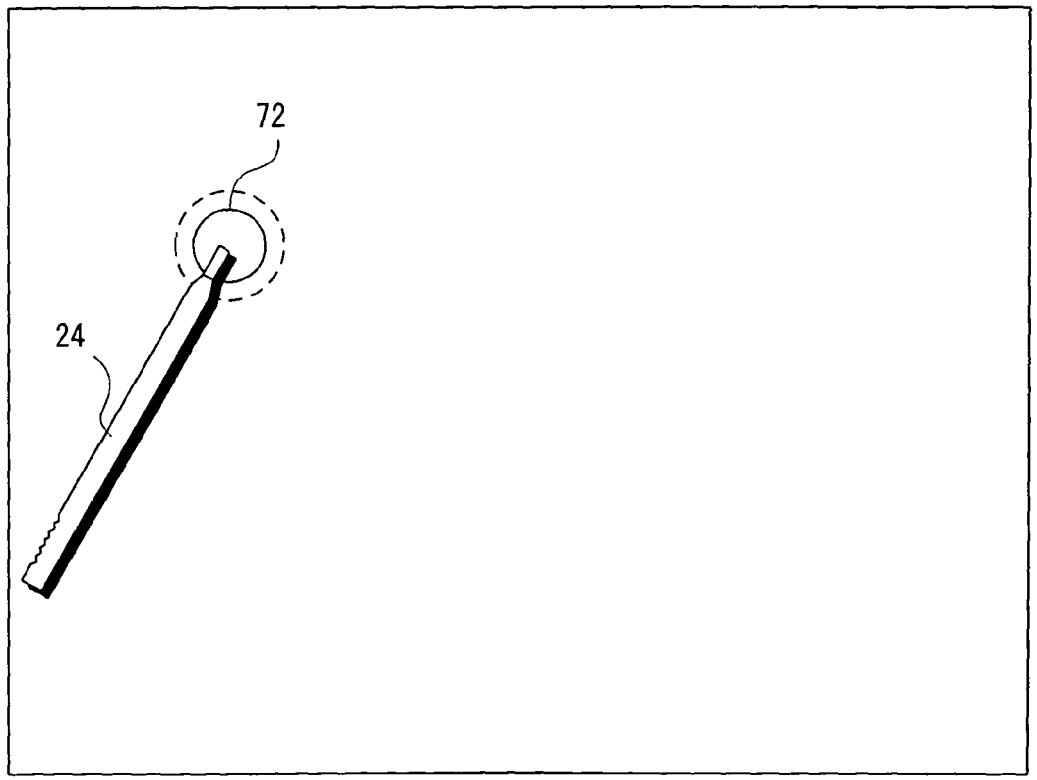

FIG. 5
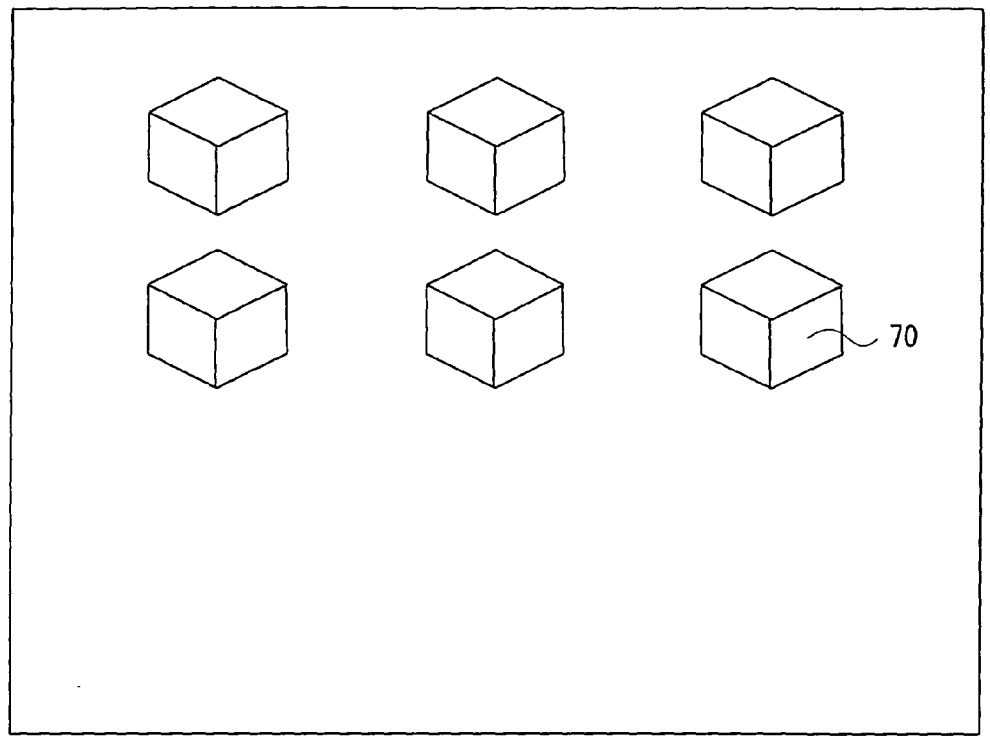
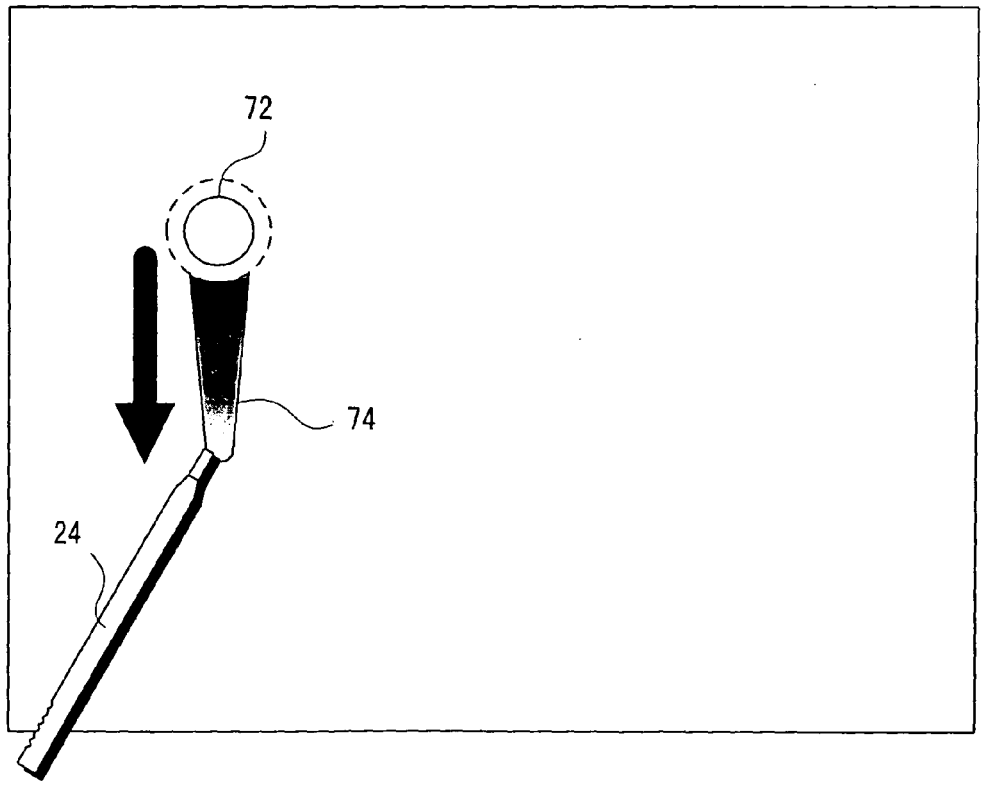

FIG. 6
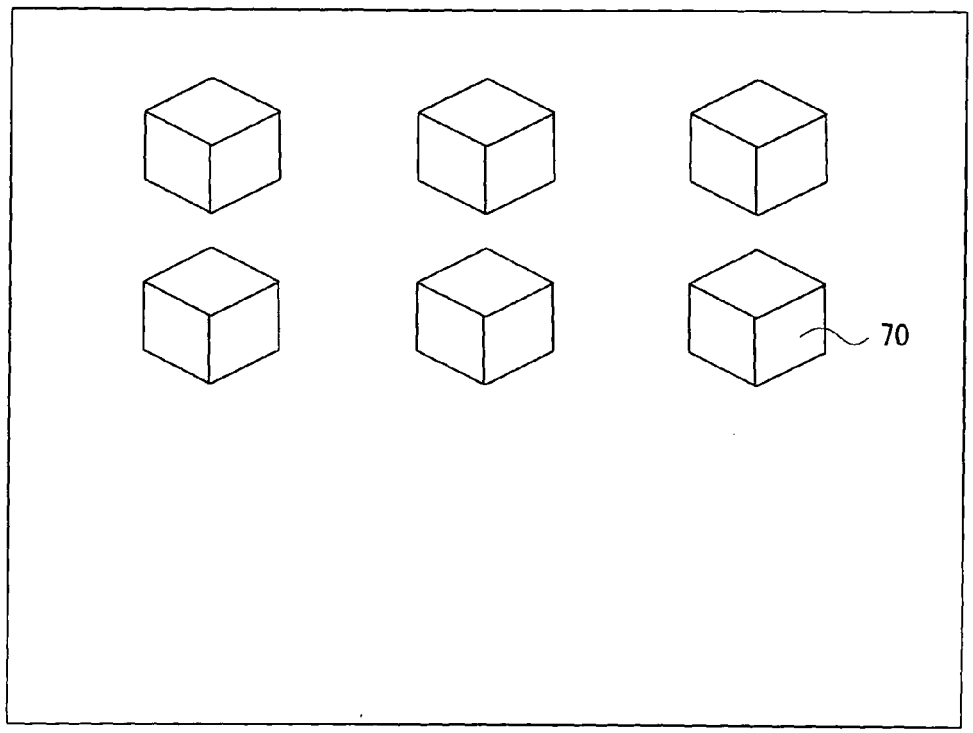
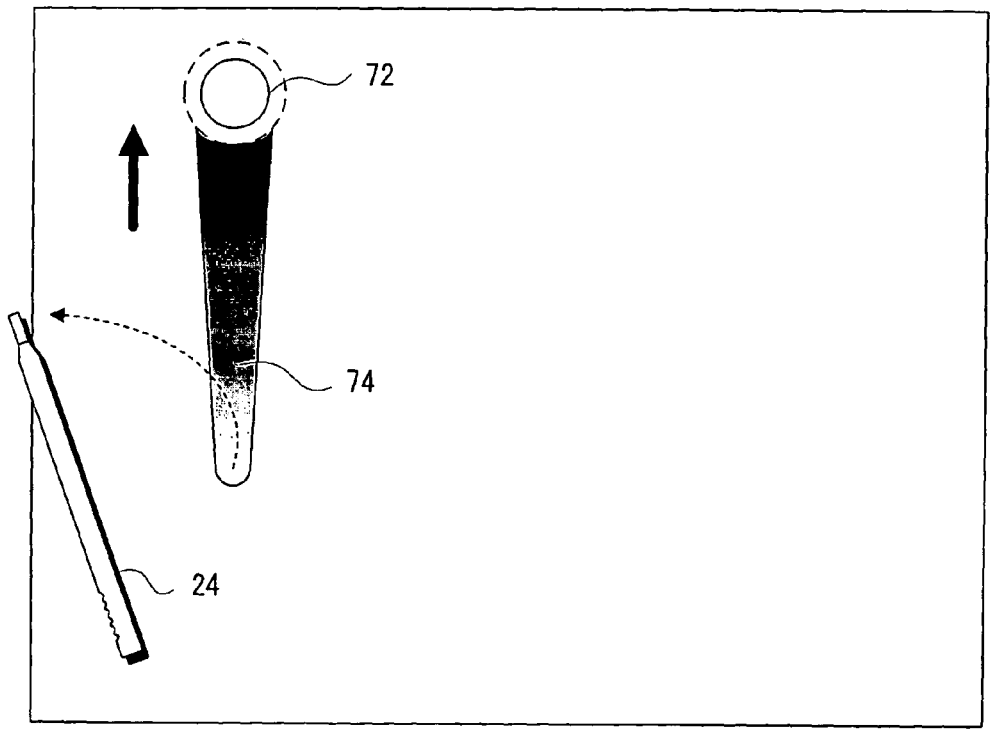

FIG. 7
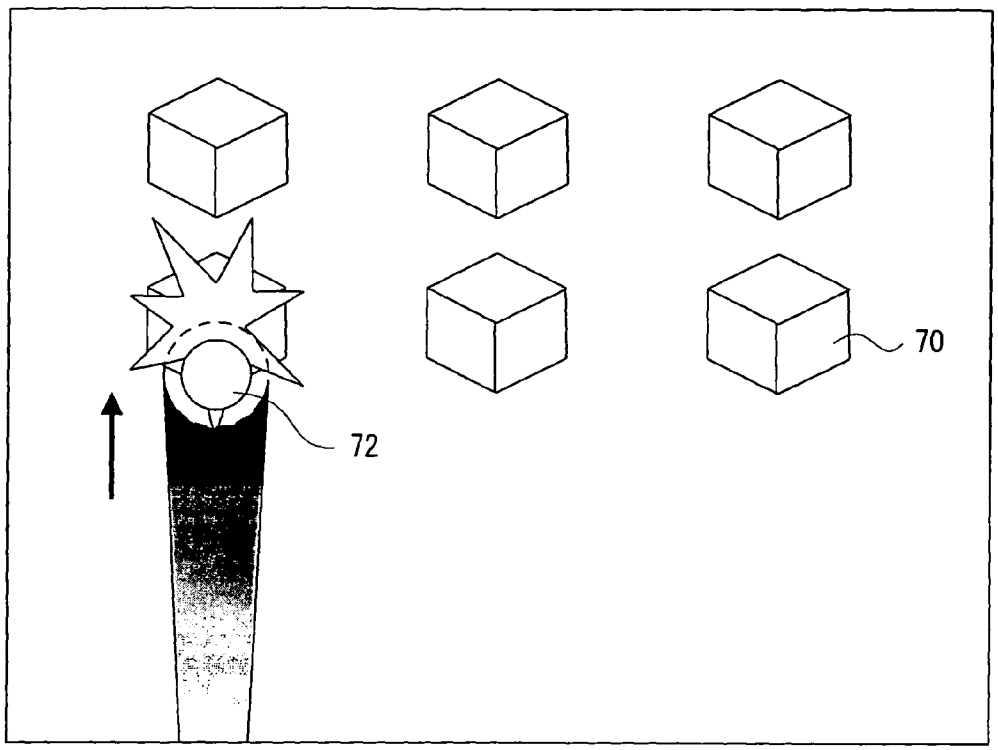
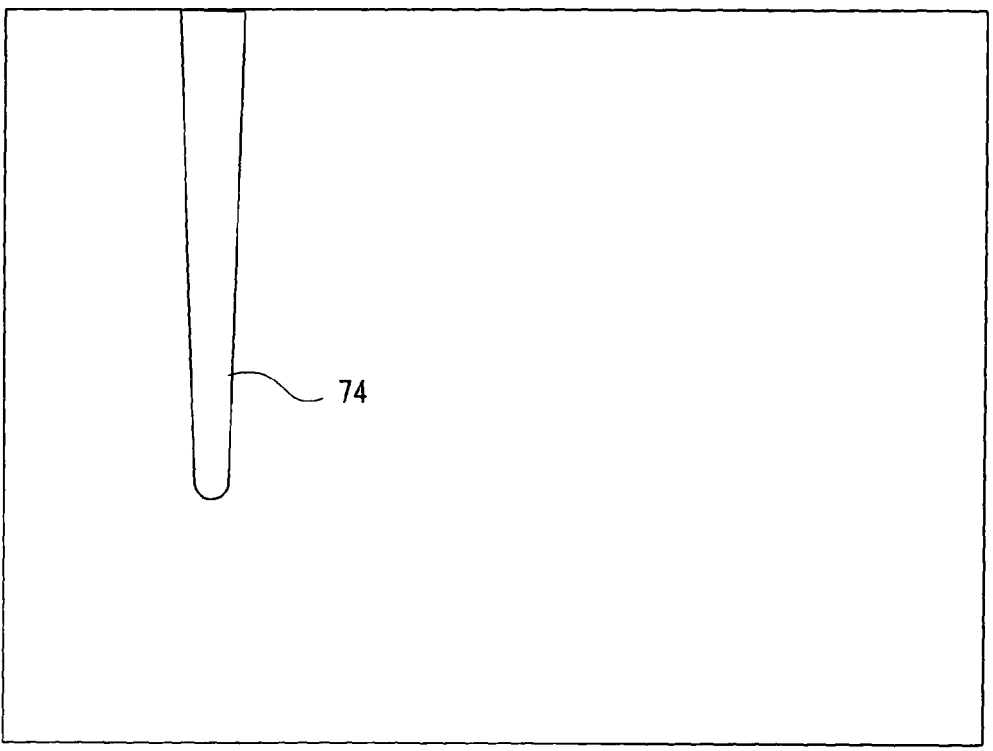

FIG. 12

BULLET CHARACTERISTICS TABLE

| TYPE | ATTACK POWER | MOVING SPEED |
|---|---|---|
| 0 (NORMAL) | A0 (NORMAL) | S0 (NORMAL) |
| 1 (POWER-UP) | A1 (HIGH) | S1 (HIGH) |

STORAGE MEDIUM STORING OBJECT CONTROL PROGRAM AND INFORMATION PROCESSING APPARATUS

CROSS REFERENCE TO RELATED APPLICATION

The disclosure of Japanese Patent Application No. 2005-216278 is incorporated herein by reference.

TECHNICAL FIELD

The exemplary embodiments disclosed herein relate to a storage medium storing an object control program and an information processing apparatus. In particular, the exemplary embodiments disclosed herein relate to a storage medium storing an object control program which, for example, causes an object to be generated and moved according to an input, and an information processing apparatus.

BACKGROUND AND SUMMARY

An example of a technique of controlling an object displayed on a touch panel is disclosed in Document 1 (Japanese Patent No. 2827612), for example. Specifically, there is described a technique that an object displayed in advance on a touch panel is touched by a finger and thereby moves in accordance with the position of the finger (drag), or the object is flipped by the finger and thereby moves inertially in a direction of the movement of the finger.

Further, Document 2 (page 31 of the manual for a game "Super Mario 64 DS"™, for a game Nintendo DS™, released in December 2004) describes a mini-game in which a slingshot bullet displayed at a predetermined position on a touch panel is moved by dragging to sling the bullet.

In Document 1 and Document 2, after a player or user touches an object being already present at a fixed position, they need to make sure of a direction they want the object to move and perform a drag operation in that direction or in the direction opposite thereto. Thus, each time the player or user tries to operate the object, they need to check the position of the object and thus operation is inconvenient. Furthermore, the operation of continuously slinging slingshot bullets is hard and thus a feeling of exhilaration is difficult to obtain and operability is not favorable.

A feature of certain exemplary embodiments is therefore to provide a novel storage medium storing a object control program and a novel information processing apparatus.

Another feature of a certain exemplary embodiment is to provide a storage medium having stored therein an object control program and an information processing apparatus, which are capable of easily generating an object in an arbitrary position and moving the object.

Still another feature of a certain exemplary embodiment is to provide a storage medium having stored therein an object control program and an information processing apparatus, which are capable of generating and moving an object by a simple, intuitive operation.

Yet another feature of a certain exemplary embodiment is to provide a storage medium having stored therein an object control program and an information processing apparatus, which are capable of easily and continuously generating a plurality of objects and moving the objects.

A storage medium storing an object control program of a first exemplary embodiment is a storage medium having stored therein an object control program of an information processing apparatus that displays on a display an object to be generated and moved according to an input from an input. The object control program stored in the storage medium causes a processor of the information processing apparatus to perform a detection, a first determination, a generation coordinate determination, object generation, and object control. In the detection, coordinates inputted from the input are detected. In the first determination, it is determined whether a first condition is satisfied, based on a detection result obtained in the detection. In the generation coordinate determination, coordinates detected in the detection when the first condition is determined to be satisfied in the first determination are determined as object generation coordinates. In the object generation, the object is generated in the object generation coordinates determined in the generation coordinate determination. In the object control, a movement of the object is controlled based on continuous detection results obtained in the detection after the object generation coordinates.

Specifically, the object control program stored in the storage medium causes the processor (42; a reference numeral corresponds to that in preferred embodiments, as will be described later; the same applies to the following) of the information processing apparatus (10) to perform the following as described below. The information processing apparatus displays on the display (12, 14) an object (72) to be generated and moved according to an input from the input (22). In the detection (S3, S5, S15, S17, S35, S37), coordinates inputted by the input are detected. In the first determination (S3, S121, S151-S157, S171, S173), it is determined based on a detection result obtained in the detection whether a first condition is satisfied. The first condition may be that there is a transition in the detection from a state in which there is no detection to a state in which there is detection, or that when a state in which there is detection continues, a changing amount in detected coordinates is less (or greater) than a threshold value (i.e., the movement speed of input coordinates is lower (or higher) than a threshold value), or that detected coordinates do not change for a predetermined time period (i.e., input coordinates have stopped for a predetermined time period), or the like. In the generation coordinate determination (S7, S181), coordinates detected when the first condition is determined to be satisfied are determined to be object generation coordinates. In the object generation (S9), an object is generated in the determined object generation coordinates. In the object generation, for example, based on object image data, an object image is displayed in the object generation coordinates. In the object generation, when object generation coordinates are determined in the object generation coordinate determination, an object image may be displayed in the determined coordinates, or after the object generation coordinates, at appropriate timing (e.g., timing at which the object starts to move), an object image may be displayed in the determined coordinates. In object control (S43, S61, S65, S93, S95, S99), the movement of the object is controlled based on continuous detection results obtained in the detection after the object generation coordinates. For example, in object control, after object generation coordinates are detected, based on results continuously detected, the movement of an object to be displayed in the object generation coordinates is controlled. Here, the expression "continuously detected" is meant to refer to a state in which, after object generation coordinates are detected, a state in which there is detection continues without going into a state in which there is no detection. Note that even when detection is over, if a state in which there is detection occurs before a certain time period has elapsed, it may be considered to be continuous detection. In this manner, an object is generated in input coordinates detected when an input detection result is determined to satisfy the first condition and the movement of the object is controlled based on continuous input detection results obtained after the generation coordinates. Thus, according to an input that satisfies the first condition and a series of inputs made after the input, an object can be easily generated in an arbitrary position and the object can be moved with the generation coordinates being a starting point.

In one aspect, the object control program may cause the processor to further perform a second determination of determining whether a second condition is satisfied, based on at least one set of coordinates which are continuously detected after the first condition is determined to be satisfied in the first determination. In object control, when the second condition is determined to be satisfied in the second determination, the movement of the object generated in the object generation may start.

Specifically, in the second determination (S21, S29, S35, S41), based on at least one set of coordinates which are continuously detected after the first condition is determined to be satisfied, i.e., based on at least one set of coordinates which are continuously detected after the object generation coordinates, it is determined whether a second condition is satisfied. The second condition may be that after the first condition is satisfied there is a transition in the detection from a state in which there is detection to a state in which there is no detection, or that when a state in which there is detection continues, a changing amount in detected coordinates is less (or greater) than a threshold value, or that detected coordinates do not change for a predetermined time period, or that coordinate detection continues which can be considered that input coordinates are distanced by a predetermined distance from coordinates detected when the first condition is satisfied or that detection of coordinates that can be regarded as inputs in a predetermined direction from the coordinates is continued, or the like. In object control, when the second condition is satisfied, a movement of the object starts. Hence, a movement of the object can start according to an input that satisfies the second condition.

In an embodiment, in object control, when detection is over after continuous detection, the movement of the object generated may start.

Specifically, the fact that detection is over after the continuous detection performed after the first condition is satisfied is determined as the second condition. Thus, when the continuous detection is over, i.e., when there is a transition from a touch-on to a touch-off, a movement of the object can start.

In another embodiment, in the object control step, a parameter for the movement of the object may be determined based on at least one set of the coordinates which are continuously detected.

Specifically, in object control (S141, S143, S43), a parameter for the movement of the object is determined based on at least one set of coordinates which are continuously detected after the first condition is satisfied. For example, the parameter may be determined by how far apart coordinates detected immediately before a touch-off are from the object generation coordinates. The parameter for the movement is, for example, the moving speed, moving direction, or moving distance of the object. Thus, the movement of the object can be controlled based on a parameter determined based on coordinates continuously detected.

In another aspect, the object control program may cause the processor to further perform a third condition determination of whether the coordinates satisfy a third condition, the coordinates being detected while continuous detection is performed after the object generation coordinates. In the object control, the movement of the object may be controlled on condition that the third condition is determined to be satisfied in the third condition determination.

Specifically, in the third condition determination (S21, S29), it is determined whether the coordinates detected during continuous detection after the object generation coordinates satisfy the third condition. The third condition may be, for example, that coordinates being continuously detected go outside of a predetermined region. Note that the predetermined region may be set with respect to the object generation coordinates. For example, the third condition may be that coordinates outside of a predetermine distance range from the object generation coordinates are detected. Alternatively, the third condition may be that the movement direction of coordinates being continuously detected is a predetermined direction. Note that the movement direction of coordinates being continuously detected may be a predetermined direction with respect to the object generation coordinates. For example, in the preferred embodiments which will be described later, the third condition is that coordinates being continuously detected are within a first effective range which is set such that an input in a predetermined direction is considered to be made. Furthermore, the third condition may be that a changing amount in coordinates continuously detected is less (or greater) than a threshold value, or that coordinates continuously detected do not change for a predetermined time period, or the like. In the object control, when the third condition is determined to be satisfied, the movement of the object is controlled; however, even when the second condition is satisfied, if the third condition is not satisfied, the object is not moved. Thus, when the coordinates detected during continuous detection after the object generation coordinates satisfy the third condition, control of the movement of the object can be started.

In another embodiment, in the third condition determination, it may be determined whether the coordinates detected while continuous detection is performed in the detection the object generation coordinates are distanced by a predetermined distance from the object generation coordinates.

Specifically, in the third condition determination (S21), as the third condition, it is determined whether the coordinates detected during continuous detection after the object generation coordinates are distanced by the predetermined distance from the object generation coordinates. Accordingly, when coordinates outside of a predetermined distance range from the object generation coordinates are detected, control of the movement of the object can be started.

In another embodiment, in the object control, when the continuous detection results obtained in the detection after the object generation coordinates satisfy the second condition, the object generated in the object generation may be moved in a certain direction.

Specifically, in the object control (S61), when the second condition is satisfied, the object is moved in the certain direction. In this exemplary embodiment, in the object control, based on the movement direction of coordinates being continuously detected (or based on a direction set with respect to the object generation coordinates), the moving direction of the object may be determined (for example, the direction opposite to the movement direction of the coordinates being continuously detected may be determined to be the moving direction of the object or the same direction may be determined to be the moving direction of the object). However, here, regardless of the contents of the continuous detection results, for example, whatever the movement direction of the coordinates being continuously detected, when the second condition is satisfied, the object is moved in the certain direction. Therefore, the object can be moved in the certain direction according to continuous inputs after the object generation coordinates which satisfy the second condition.

In another embodiment, in the second determination, a determination may be made as to the following additional condition, in addition to the second condition. That is, as the additional condition, it is determined whether coordinates are present in a direction in a predetermined range having, as a center, the same direction as or a direction opposite to the certain direction (the moving direction of the object in the aforementioned embodiment) from the object generation coordinates, the coordinates being detected while continuous detection is performed succeeding to the object generation coordinates after the first condition is determined to be satisfied in the first determination. Note that when the coordinates detected during continuous detection are gone outside of the predetermined direction range, then it may be immediately determined that the additional condition is not satisfied, or even when the coordinates are gone outside of the predetermined direction range in the process of continuous detection, if coordinates detected at the time when the second condition is satisfied are present in the predetermined direction range, it may be determined that the additional condition is satisfied.

Specifically, in the second determination (S29, S41), in addition to the second condition, it is determined whether, after the first condition is determined to be satisfied, the coordinates detected during continuous detection after the object generation coordinates are present in the predetermined direction range having, as the center, the same direction as or the direction opposite to the certain direction from the object generation coordinates. That is, when the movement direction of coordinates being continuously detected is a direction included in a predetermined range having, as the center, the same direction as or the direction opposite to the certain direction which is the moving direction of the object, the additional condition is satisfied. In the preferred embodiments which will be described later, a determination as to whether continuously detected coordinates after the object generation coordinates are present in a direction included in a range extending at an angle of θ with respect to a downward direction from the object generation coordinates, is made based on the first effective range. Furthermore, a determination as to whether input coordinates detected immediately before a touch-off are present in a direction included in a range extending at an angle of θ with respect to the downward direction from the object generation coordinates (furthermore, in the embodiments, whether the coordinates have moved by a predetermined distance d2), is made based on a second effective range. When the second condition is satisfied, in the object control, the movement of the object in the certain direction starts. Thus, when an input is made in the same direction as or the direction opposite to the moving direction of the object, the object can be moved in the certain direction.

In another aspect, the object control program may cause the processor to further perform a fourth condition determination and an object elimination. In the fourth condition determination, it is determined whether the coordinates detected in the detection while continuous detection is performed after the object generation coordinates satisfy a fourth condition. In the object elimination, the object generated in the object generation is eliminated when the fourth condition is determined to be satisfied in the fourth condition determination.

Specifically, in the fourth condition determination (S15, S21, S29), it is determined whether the coordinates detected during continuous detection after the object generation coordinates satisfy the fourth condition. The fourth condition may be, for example, that coordinates being continuously detected are gone outside of a predetermined region, or that detection is over before the coordinates go outside of the predetermined region, or that detection is over before the second condition is satisfied and the movement of the object starts. Note that the predetermined region may be set with respect to the object generation coordinates. Alternatively, the predetermined region may be a predetermined direction (certain range) set with respect to the object generation coordinates. Furthermore, the fourth condition may be that the changing amount in detected coordinates is less (or greater) than a threshold value, or that detected coordinates do not change for a predetermined time period, or the like. In the object elimination (S45), when the fourth condition is satisfied, display of the object image is deleted from the object generation coordinates. Thus, when the coordinates detected during continuous detection after the object generation coordinates satisfy the fourth condition, the object can be eliminated without being moved.

In another embodiment, in the fourth condition determination, as the fourth condition, a fact is determined that before the coordinates go outside of a second region, detection is over, the coordinates being detected while continuous detection is performed after the object generation coordinates, the second region being provided with respect to the object generation coordinates.

Specifically, in the fourth condition determination (S15, S21), as the fourth condition, it is determined whether detection is over before coordinates being continuously detected go outside of the second region range. The second region may be a region within a predetermined distance with respect to the object generation coordinates. Thus, when detection is over before the coordinates detected during continuous detection after the object generation coordinates go outside of the second region, the object being generated can be eliminated.

In still another embodiment, in the fourth condition determination, as the fourth condition, a fact is determined that the coordinates go outside of a third region which is provided with respect to the object generation coordinates, the coordinates being detected in the detection while continuous detection is performed after the object generation coordinates.

Specifically, in the fourth condition determination (S29), as the fourth condition, it is determined whether coordinates being continuously detected are gone outside of the third region which is provided with respect to the object generation coordinates. The third region may be a region which, for example, includes a region within a predetermined distance surrounding the object generation coordinates and a region within a predetermined range having, as the center, a predetermined direction from the object generation coordinates. In the embodiments which will be described later, the first effective range can be used. Therefore, when the coordinates detected during continuous detection after the object generation coordinates go outside of the third region, the object being generated can be eliminated.

In another embodiment, in the object control, in a case that detection is over after the continuous detection, when the coordinates detected immediately before the detection is over are within a fourth region provided with respect to the object generation coordinates different from the third region, the movement of the object generated in the object generation starts.

Specifically, in the object control, in the case in which detection is over after continuous detection (S35), when coordinates detected immediately before the detection is over are determined to be within the fourth region which is provided with respect to object generation coordinates (S41), the movement of the object starts. The fourth region is different from the third region. For example, the fourth region may be a range within which the coordinates can be considered to have moved by at least a predetermined distance in a predetermined direction from the object generation coordinates. In the preferred embodiments which will be described later, the second effective range can be used. Thus, when coordinates detected immediately before continuous detection is over are within the fourth region, the object can be moved.

In still another embodiment, the third region may be present in all directions of the object generation coordinates, and the fourth region may be present only in a predetermined direction of the object generation coordinates.

Specifically, the third region is present in all directions of the object generation coordinates. In the preferred embodiments which will be described later, the first effective range which includes a region extending by a predetermined distance in all directions from the object generation coordinates can be used. On the other hand, the fourth region is present only in the predetermined of the object generation coordinates. In the preferred embodiments which will be described later, the second effective range which extends only in the predetermined direction from a position moved by a predetermined distance in the predetermined direction from the object generation coordinates can be used. Accordingly, when determining an elimination condition of the object, it is determined whether the coordinates go outside of a region present in all directions of the object generation coordinates and thus even when, for example, an input is made in a direction other than the predetermined direction due to shaking of the hand of the player or user, it is possible not to eliminate the object. In addition, when determining a movement condition of the object, it is determined whether the coordinates go outside of a region present only in the predetermined direction of the object generation coordinates and thus it is possible to surely determine whether an input is made in the predetermined direction.

In another embodiment, the second condition may include that an input direction is a predetermined direction, the input direction being based on the object generation coordinates and at least one set of coordinates which are continuously detected after the object generation coordinates. In the object control, the object is moved when the second condition is determined to be satisfied in the second determination.

Specifically, as the second condition, it is determined whether an input direction based on the object generation coordinates and at least one set of coordinates detected continuously after the object generation coordinates is the predetermined direction (S21, S29, S41). In the object control (S61), when the input direction is determined to be the predetermined direction, the object is moved. Thus, by an input made in the predetermined direction after the object generation coordinates, the object can be moved.

In another embodiment, the input may be for detecting coordinates on the display. The predetermined direction in the second condition may be the same direction as or a direction opposite to a moving direction of the object in the object control.

Specifically, the input is for detecting coordinates on the display. For example, the input may be a pointing device for designating a position on a display screen. Since the input direction is determined based on the object generation coordinates and at least one set of coordinates detected continuously after the object generation coordinates, by this input a desired direction can be easily and intuitively inputted. When there is an input in the predetermined direction after the object generation coordinates, the object can be moved in the same direction as or the direction opposite to the predetermined direction. For example, in response to an input of pushing forward or an input of pulling backward, the object can be fired in the same direction as or the direction opposite thereto, and thus, the object can be moved by an intuitive input operation.

In another embodiment, the predetermined direction may be a direction having a positive component of a first direction, and the moving direction of the object may be a direction opposite to the first direction. That is, when there is an input, after the object generation coordinates, in a direction having the positive component of the first direction, the object can be moved in the direction opposite to the first direction. Therefore, by making an input in such a wide range that includes the positive component of the first direction from the object generation coordinates, the object can be easily moved in the direction opposite to the first direction.

In another embodiment, the predetermined direction may fall within a range of less than 90 degrees centering a first direction and the moving direction of the object may be a direction opposite to the first direction. That is, when there is an input in a direction within the range of less than 90 degrees centering a first direction after the object generation coordinates, the object can be moved in the direction opposite to the first direction. Thus, by making an input in a relatively wide range of less than 90 degrees centering a first direction with respect to the object generation coordinates, the object can be easily moved in the direction opposite to the first direction.

In another embodiment, the object control may further include: determining an input direction by the input, based on the object generation coordinates and at least one set of coordinates which are continuously detected after the object generation coordinates; and determining a moving direction of the object based on the input direction determined in the input direction determination, and when the second condition is determined to be satisfied in the second determination, the object may be moved in the moving direction determined in the moving direction determination.

Specifically, in the input direction determination (S91), an input direction by the input is determined based on the object generation coordinates and at least one set of coordinates which are continuously detected after the object generation coordinates. In the moving direction determination (S93), the moving direction of the object is determined based on the determined input direction. In the object control (S95), when the second condition is determined to be satisfied, the object is moved in the determined moving direction. Therefore, since the moving direction is determined according to the direction of an input made after the object generation coordinates, the moving direction of the object can be controlled by a direction to be inputted.

In another embodiment, in the input direction determination, a direction that connects the object generation coordinates with coordinates detected in the detection when the second condition is determined to be satisfied in the second determination is determined to be the input direction. That is, a direction that connects coordinates detected when the first condition is determined to be satisfied with coordinates detected when the second condition is determined to be satisfied is determined to be an input direction, and based on the input direction the moving direction of the object is determined. Accordingly, by making an input that satisfies the first condition and an input that satisfies the second condition in appropriate positions, the user can move the object in a desired direction.

In another embodiment, in the moving direction determination, a reversed direction from the input direction is determined to be the moving direction of the object. That is, the direction opposite to an input direction is determined to be a moving direction. Therefore, the object can be moved in the direction opposite to the direction of an input made after the object generation coordinates. For example, in response to an input of pulling, the object can be fired in the direction opposite thereto, and thus, the object can be moved by an intuitive input operation.

In another embodiment, in the input direction determination, based on coordinates detected in the detection during a time period, the input direction for each time period is determined, the time period being from when the first condition is determined to be satisfied in the first determination until when the second condition is determined to be satisfied in the second determination step, in the moving direction determination, based on the input direction for the each time period, a moving direction of the object for the each time period is determined, in the object generation, the different objects for the different time periods are generated in the respective object generation coordinates determined for the different time periods, and in the object control, the objects are moved in the respective moving directions determined for the different time periods.

Specifically, based on an input direction determined for each time period from when the first condition is satisfied until when the second condition is satisfied, the moving direction is determined. In addition, different objects for different time periods are generated in the respective object generation coordinates determined for the different time periods and the objects are moved in the respective moving directions determined for the different time periods. Thus, by repeating inputs satisfying the first and second conditions, a plurality of or multiple objects can be continuously and easily generated and the objects can be moved in the respective moving directions.

In another embodiment, in the object generation, different objects may be generated for different determinations in the generation coordinate determination. That is, each time the first condition is satisfied, a new object is generated, and thus, a plurality of or multiple objects can be continuously and easily generated.

In another embodiment, in the object generation, the object may be generated when the second condition is determined to be satisfied in the second determination. That is, when it is determined based on continuous inputs made after the object generation coordinates that the second condition is satisfied, the object can be generated and moved.

In still another embodiment, in the object generation, in a case that, during a time period from when the first condition is determined to be satisfied in the first determination until when the second condition is determined to be satisfied in the second determination, it is further determined in the first determination that the first condition is satisfied, a first object is generated in the object generation coordinates which are determined when the first condition which is a first one is determined to be satisfied, and a second object different from the first object is generated in the object generation coordinates which are determined when the first condition which is a second one is determined to be satisfied. That is, when, after the first condition is satisfied and before the second condition is determined to be satisfied, the first condition is determined to be satisfied again, each time the first condition is satisfied, a new object can be generated. Accordingly, a plurality of or multiple objects can be continuously and easily generated.

In another aspect, the object control program may cause the processor to further perform a time measurement of measuring a time during which coordinates are continuously present within a predetermined region from the object generation coordinates, the coordinates being detected in the detection after the first condition is determined to be satisfied in the first determination. The object control may include a first characteristic setting of setting at least one of type data on the object and a movement parameter of the object, according to the time measured.

Specifically, in the time measurement (S23), a time during which coordinates detected after the first condition is satisfied are continuously present within the predetermined region from the object generation coordinates. In the first characteristic setting (S25, S27), type data on the object or a movement parameter of the object are set according to the measured time. The movement parameter may be, for example, a moving speed, a moving direction, or a moving distance. Hence, by continuously making an input in the predetermined region from the object generation coordinates, the type or movement parameter of the object can be easily changed.

In still another aspect, the object control program may cause the processor to further perform a distance calculation of calculating a distance between the object generation coordinates and coordinates detected when the second condition is determined to be satisfied in the second determination. The object control may include a second characteristic setting of setting at least one of type data on the object and a movement parameter of the object, according to the distance calculated in the distance calculation.

Specifically, in the distance calculation (S141), the distance between the object generation coordinates and coordinates detected when the second condition is satisfied is calculated. In the second characteristic setting (S143), according to the calculated distance, type data on the object or a movement parameter of the object is set. Thus, the type or movement parameter of the object can be easily changed depending on a position, with respect to the object generation coordinates, in which an input that satisfies the second condition is made.

In another embodiment, the object control may include a third characteristic setting of setting at least one of type data on the object and a movement parameter of the object, according to the object generation coordinates determined in the generation coordinate determination. That is, in the third characteristic setting (S131), type data on the object or a movement parameter of the object is set according to the object generation coordinates. Therefore, the type or movement parameter of the object can be easily changed depending on a position where an input that satisfies the second condition is made.

In another aspect, the object control program may cause the processor to further perform: controlling generation and movement of a shooting target object; determining whether there is a collision between the object and the shooting target object; and eliminating the shooting target object when it is determined that the object has collided with the shooting target object.

Specifically, in the shooting target control (S1), the generation and movement of a shooting target object (70) is controlled. In the collision determination (S67, S101), it is determined whether there is a collision between the object and the shooting target object. In the collision (S71, S109), when a collision occurs, the shooting target object is eliminated. Thus, for example, a shooting game with high strategic characteristics can be realized in which by generating an object in an arbitrary position and moving the object in a predetermined moving direction, a shooting target object is shot down.

In another embodiment, the shooting target control may include setting endurance data for each shooting target object. The collision may include subtracting, when it is determined that the object has collided with the shooting target object, endurance indicated by the endurance data on the shooting target object, and the shooting target object is eliminated when the endurance after the subtraction becomes lower than or equal to a predetermined threshold value.

Specifically, in the endurance setting (S1), endurance data is set for each shooting target object. In the subtraction (S75, S105), when a collision occurs, the endurance of the shooting target object is subtracted. In the collision, when the endurance becomes lower than or equal to a predetermined threshold value (S107), the shooting target object is eliminated. Therefore, for example, a shooting game with high strategic characteristics can be provided in which until the endurance of a shooting target object becomes zero, the necessary number of objects are generated one after another to cause a collision.

In another aspect, the object control program may cause the processor to further perform measuring, for each object, a time during which, after the first condition is determined to be satisfied in the first determination, coordinates detected in the detection are continuously present within a predetermined region from the object generation coordinates. In the collision, the longer the time measured in the time measurement for the object having collided with the shooting target object, the larger a value to be subtracted from the endurance data on the shooting target object. Thus, for example, a shooting game with high strategic characteristics can be provided in which by continuously making an input in the predetermined region from the object generation coordinates, the attack power of each object can be increased.

In another aspect, the object control program may cause the processor to further perform calculating, for each object, a distance between the object generation coordinates and coordinates detected when the second condition is determined to be satisfied. In the collision, the longer the distance calculated in the distance calculation for the object having collided with the shooting target object, the larger a value to be subtracted from the endurance data on the shooting target object. Accordingly, for example, a shooting game with high strategic characteristics can be provided in which by making an input that satisfies the second condition, at a position further distanced from the object generation coordinates, the attack power of each object can be increased.

In another embodiment, in the collision, according to the object generation coordinates of the object having collided with the shooting target object, a value to be subtracted from the endurance data on the shooting target object may be changed. Thus, a shooting game with high strategic characteristics can be provided in which the attack power of each object can be changed according to a position where an input that satisfies the first condition is made.

In still another embodiment, the input may be a touch panel placed over a display screen of the display. Hence, by an input operation which is simple and intuitive, as if the player or user were directly touching on a display screen, an object can be generated in an arbitrary position and moved.

A storage medium storing an object control program of a second exemplary embodiment is a storage medium having stored therein an object control program of an information processing apparatus that displays on a display an object to be generated and moved according to an input from an input. The object control program stored in the storage medium causes a processor of the information processing apparatus to perform a detection, a first determination, a generation coordinate determination, an object generation, an outside-of-region determination, an object control, and an object elimination. In the detection, coordinates inputted from the input are detected. In the first determination, it is determined whether a first condition is satisfied, based on a detection result obtained in the detection. In the generation coordinate determination, as object generation coordinates, coordinates detected in the detection when the first condition is determined to be satisfied in the first determination are determined. In the object generation, the object is generated in the object generation coordinates determined in the generation coordinate determination. In the outside-of-region determination, it is determined whether the coordinates are outside of a first region which is provided with respect to the object generation coordinates, the coordinates being detected in the detection while continuous detection is performed in the detection after the object generation coordinates. In the object control, a movement of the object generated in the object generation is started when detection in the detection is over after the coordinates detected during the continuous detection are determined to be outside of the first region in the outside-of-region determination. In the object elimination, the object generated in the object generation is eliminated when detection in the detection is over before the coordinates detected during the continuous detection are determined to be outside of the first region in the outside-of-region determination.

The second exemplary embodiment is directed to a storage medium having stored therein an object control program of an information processing apparatus (10) which is similar to that of the aforementioned first exemplary embodiment. In the detection (S3, S5, S15, S17, S35, S37), coordinates inputted from the input are detected. In the first determination (S3, S121, S151-S157, S171, S173), it is determined whether a first condition is satisfied, based on a detection result obtained in the detection. The first condition may be that there is a transition in the detection from a state in which there is no detection to a state in which there is detection, or that when a state in which there is detection continues, the changing amount in detected coordinates is less (or greater) than a threshold value, or that detected coordinates do not change for a predetermined time period, or the like. In the generation coordinate determination (S7, S181), coordinates detected when the first condition is determined to be satisfied are determined to be object generation coordinates. In the object generation (S9), an object is generated in the determined object generation coordinates. In the object generation step, for example, an object image is displayed in the object generation coordinates based on object image data. Alternatively, in the object generation step, when object generation coordinates are determined in the object generation coordinate determination step, an object image may be displayed in the determined coordinates, or after the object generation coordinates, at appropriate timing (e.g., timing at which the object starts to move), an object image may be displayed in the determined coordinates. In the outside-of-region determination (S21, S185), it is determined whether the coordinates detected while continuous detection is performed in the detection are outside of the first region which is provided with respect to the object generation coordinates. The first region may be a region within a predetermined distance from the object generation coordinates. In the object control (S35, S43, S61, S65, S93, S95, S99), a movement of the object is started when detection in the detection is over after the coordinates detected during the continuous detection are determined to be outside of the first region. In the object elimination (S15, S45), the object is eliminated when detection in the detection is over before the coordinates detected during the continuous detection are determined to be outside of the first region. In this manner, by making an input that satisfies the first condition, an object can be easily generated in an arbitrary position. Then, after coordinates outside of the first region are inputted by continuous inputs made after the object generation coordinates, a touch-off state is caused, whereby the generated object can be easily started to move. In addition, before inputting coordinates outside of the first region by continuous inputs made after the object generation coordinates, a touch-off state is caused, whereby the generated object can be easily eliminated.

An information processing apparatus of a third exemplary embodiment is an information processing apparatus that displays on a display an object to be generated and moved according to an input from an input. The information processing apparatus comprises detection means, first determination means, generation coordinate determination means, object generation means, and object control means. The detection detects coordinates inputted from the input. The first determination determines whether a first condition is satisfied, based on a detection result obtained by the detection means. The generation coordinate determination determines, as object generation coordinates, coordinates detected by the detection when the first condition is determined to be satisfied by the first determination means. The object generation generates the object in the object generation coordinates determined by the generation coordinate determination means. The object control controls a movement of the object based on continuous detection results obtained by the detection after the object generation coordinates.

The third exemplary embodiment is directed to an information processing apparatus corresponding to the storage medium having stored therein the object control program of an aforementioned first exemplary embodiment. As in the first exemplary embodiment, an object can be easily generated in an arbitrary position and the object can be moved.

An information processing apparatus of a fourth exemplary embodiment is an information processing apparatus that displays on a display an object to be generated and moved according to an input from an input. The information processing apparatus comprises detection means, first determination means, generation coordinate determination means, object generation means, outside-of-region determination means, object control means, and object elimination means. The detection detects coordinates inputted from the input. The first determination determines whether a first condition is satisfied, based on a detection result obtained by the detection means. The generation coordinate determination determines, as object generation coordinates, coordinates detected by the detection when the first condition is determined to be satisfied by the first determination means. The object generation generates the object in the object generation coordinates determined by the generation coordinate determination means. The outside-of-region determination determines whether the coordinates are outside of a first region which is provided with respect to the object generation coordinates, the coordinates being detected by the detection while continuous detection is performed by the detection after the object generation coordinates. The object control starts a movement of the object generated by the object generation means, when detection by the detection is over after the coordinates detected during the continuous detection are determined to be outside of the first region by the outside-of-region determination means. The object elimination eliminates the object generated by the object generation means, when detection by the detection is over before the coordinates detected during the continuous detection are determined to be outside of the first region by the outside-of-region determination means.

The fourth exemplary embodiment is directed to an information processing apparatus corresponding to the storage medium having stored therein the object control program of the aforementioned second exemplary embodiment. As in the second exemplary embodiment, an object can be easily generated in an arbitrary position and the movement and elimination of the object can be easily controlled.

According to certain exemplary embodiments, according to an input that satisfies the first condition, an object is generated in coordinates detected when the first condition is satisfied. Furthermore, based on continuous inputs made after the object generation coordinates, the movement and elimination of the object is controlled. For example, with the generation position being a starting point, the object can be moved in a specific direction or a direction based on an input direction. As such, by a series of inputs, an object can be easily generated in an arbitrary position and moved. Accordingly, for example, in the case of a game, the generation position (starting point of movement) and moving direction of an object can be freely controlled by an input by the player, and thus, the strategic characteristics of the game can be improved. In addition, for example, in the case in which different objects for different determined object generation coordinates are generated and the objects are moved in the same direction as or the direction opposite to an input direction, multiple objects can be continuously generated and moved by a simple, intuitive operation, and thus, a feeling of exhilaration can be obtained, providing a game that even beginners can enjoy.

The above and other objects and features and advantages of certain exemplary embodiments will more fully be apparent from the following detailed description of the exemplary embodiments with accompanying drawings.

BRIEF DESCRIPTION OF THE DRAWINGS

FIG. 3 is an illustrative view showing an exemplary initial screen on which a plurality of enemy characters are displayed on an upper screen;

FIG. 4 is an illustrative view showing an exemplary display screen for the case in which a bullet object is generated on a lower screen by a touch input;

FIG. 5 is an illustrative view showing an exemplary display screen for the case in which after the operation in FIG. 4 the bullet object in a touch-on state is moved in a downward direction;

FIG. 6 is an illustrative view showing an exemplary display screen for the case in which after the operation in FIG. 5 the bullet object is brought into a touch-off state and moved in an upward direction;

FIG. 7 is an illustrative view showing an exemplary display screen for the case in which after the operation in FIG. 6 the bullet object collides with an enemy character;

FIG. 12 is an illustrative view showing exemplary content of bullet characteristics table data;

DETAILED DESCRIPTION

Figure 1:
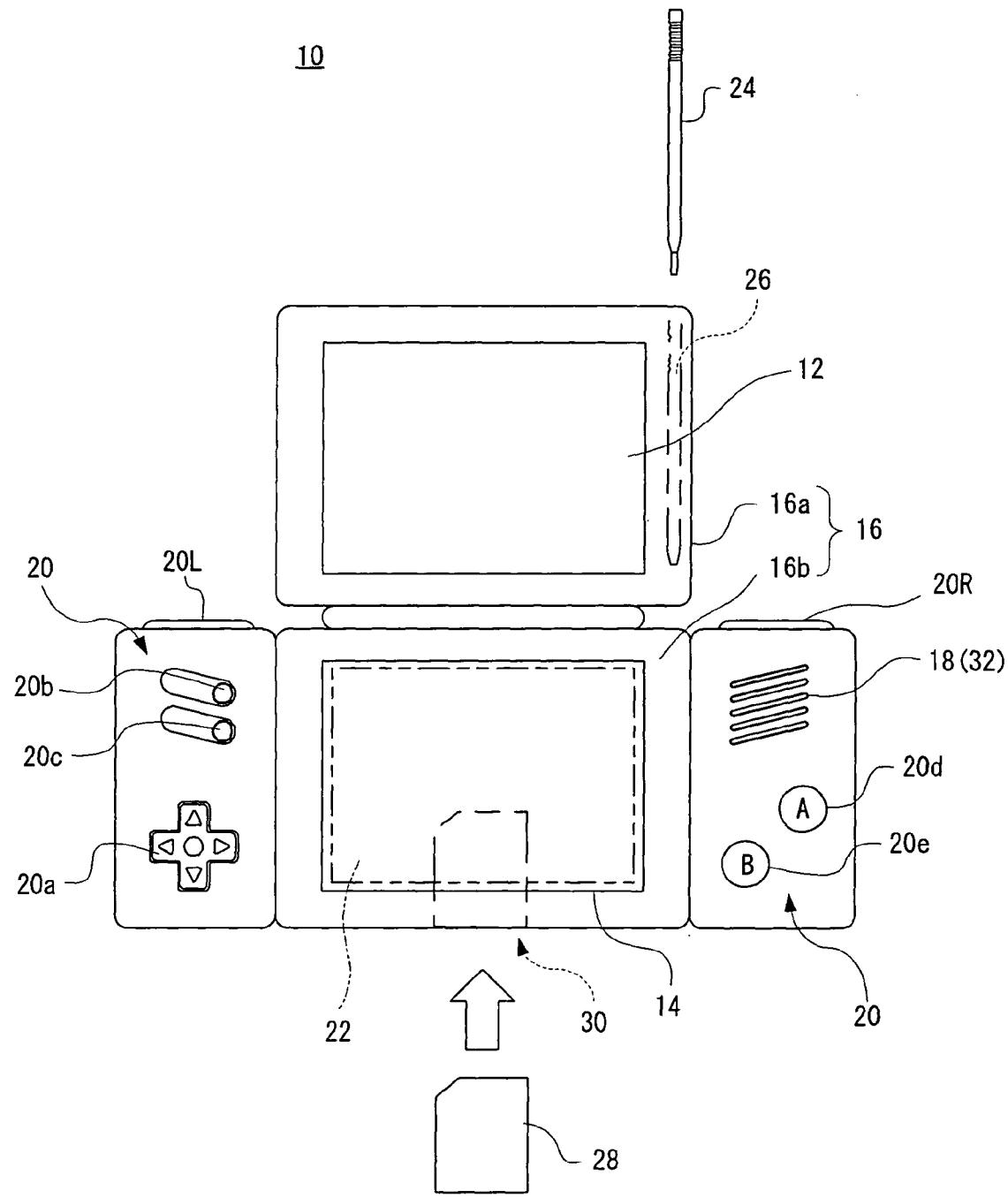
FIG. 1 is an external view showing an exemplary information processing apparatus according to an embodiment of in accordance with an exemplary embodiment.

Referring to FIG. 1, an information processing apparatus 10 which is one exemplary embodiment can be implemented as a form of game apparatus, for example. The game apparatus 10 includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and operating switches 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switches 20 include a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion with the upper housing 16a, and lie of each side of the connected portion.

The direction instructing switch 20a functions as a digital joystick, and is utilized for instructing a moving direction of a player character (or player object) to be operated by a player and a cursor, and so forth by operating any one of four depression portions. The start switch 20b is formed by a push button, and is utilized for starting (restarting), temporarily stopping a game, and so forth. The select switch 20c is formed by the push button, and utilized for a game mode selection, etc.

The action switch 20d, that is, the A button is formed by the push button, and allows the player character to perform an arbitrary movement (action), except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation by depressing, stroking, touching, hitting, and so forth with a stick 24, a pen (stylus pen), or a finger (hereinafter, referred to as "stick 24, etc.") on a top surface of the touch panel 22, the touch panel 22 detects a coordinates position operated by the stick 24, etc. (that is, touched) to output coordinates data corresponding to the detected coordinates.

It should be noted that in this embodiment, a resolution of the display surface of the LCD 14 is 256 dots×192 dots, and a detection accuracy of a detection surface (operation surface) of the touch panel 22 is also rendered 256 dots×192 dots in correspondence to the resolution of the display surface (this is true for the LCD 12). However, in FIG. 1, in order to simply represent the touch panel 22, the touch panel 22 is displayed different from the LCD 14 in size, but the display screen of the LCD 14 and the operation screen of the touch panel 22 are the same in size. It should be noted that the detection accuracy of the touch panel 22 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this embodiment), and a game screen (operation screen) including an image such as textual information, an icon, etc. for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point a character image such as a player character, an enemy character, an item character, texture information, an icon, etc. to be displayed on the LCD 14 and select commands by operating the touch panel 22 with the use of the stick 24, etc.

It should be noted that depending on the kind of the game, the player is able to use the LCD 14 for another various input instructions, such as selecting or operating the icon displayed on the LCD 14, instructing a coordinate input, and so forth.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operating portions (20, 22) of two systems.

Furthermore, in this embodiment, the stick 24 can be inserted into a housing portion (housing slot) 26 provided in proximity to a side surface (right side surface) of the upper housing 16a, for example, and taken out therefrom as necessary. It should be noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b.

Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It should be noted that although not illustrated in FIG. 1, a speaker 32 (see FIG. 2) is provided at a position corresponding to the sound release hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
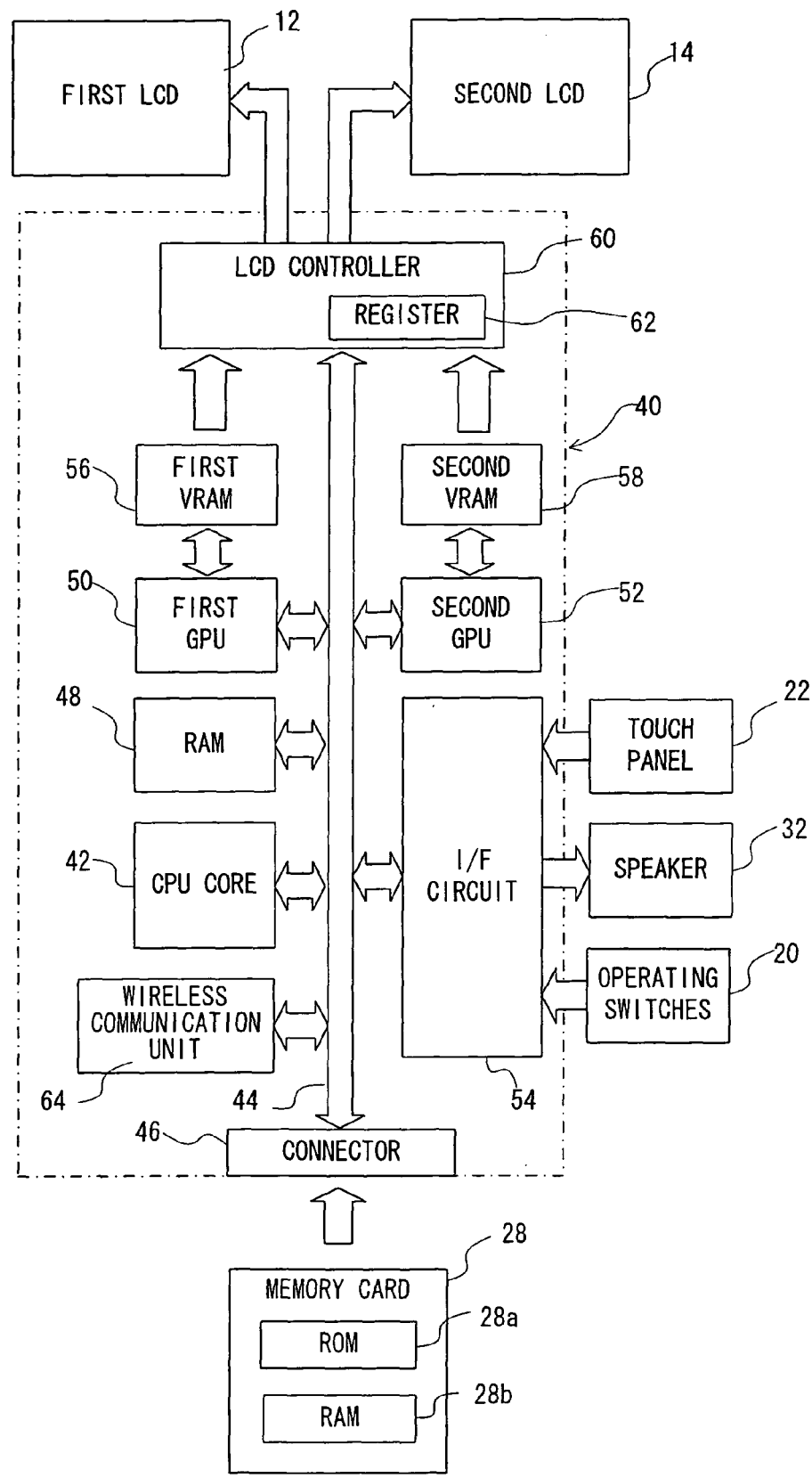
FIG. 2 is a block diagram showing an electrical configuration of the embodiment of FIG. 1.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, and an input-output interface circuit (hereinafter, referred to as "I/F circuit") 54, an LCD controller 60, and a wireless communication portion 64.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a, or "storage medium," stores in advance a game program for a game (virtual game) to be executed by the game apparatus 10, image data (character image, background image, item image, icon (button) image, message image, cursor image etc.), data of the sound (music) necessary for the game (sound data), etc. The RAM (backup RAM) 28b stores (saves) proceeding data and result data of the game.

In addition, in a case that an application other than the games, in the ROM 28a in the memory card 2, a program for the application and image data and so on necessary to execution of the application are stored. Furthermore, as necessary, sound (music) data may be stored therein.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing data (game data, flag data, etc.) generated or obtained in correspondence with a progress of the game in the RAM 48.

It should be noted that the program, the image data, the sound data, etc. are loaded from the ROM 28a entirely at a time, or partially and sequentially as necessary so as to be stored into the RAM 48. However, as in the present embodiment, in a case that the storage medium fixedly storing the program and the data is capable of being directly connected to the CPU core 42, since the CPU core 42 can directly access the storage medium, it is unnecessary to transfer and store the program and the data into the RAM 48.

Each of the GPU 50 and the GPU 52 forms a part of a rendering means, is constructed by, for example, a single chip ASIC, and receives a graphics command (construction command) from the CPU core 42 to generate game image data according to the graphics command. It should be noted that the CPU core 42 applies an image generation program (included in the game program) to both of the CPU 50 and GPU 52.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. It should be noted that the CPU core 42 reads image data necessary for rendering from the RAM 48, and writes it to the first VRAM 56 and the second VRAM 58. The GPU 50 accesses the VRAM 56 to generate game image data for display, and stores it in a rendering buffer in the VRAM 56. The GPU 52 accesses the VRAM 58 to create game image data for display, and stores the image data in a rendering buffer of the VRAM 58. A flame buffer or a line buffer may be employed as a rendering buffer.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data created by the GPU 50 to the LCD 12, and outputs the game image data created by the GPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

It should be noted that the LCD controller 60 can directly read the game image data from the VRAM 56 and the VRAM 58, or read the game image data from the VRAM 56 and the VRAM 58 via the GPU 50 and the GPU 52.

Also, the VRAM 56 and the VRAM 58 may be provided in the RAM 48, or the rendering buffer and a Z buffer may be provided in the RAM 48.

The I/F circuit 54 is connected with the operating switch 20, the touch panel 22 and the speaker 32. Here, the operating switch 20 is the above-described switches 20*a*, 20*b*, 20*c*, 20*d*, 20*e*, 20L and 20R, and in response to an operation of the operating switch 20, a corresponding operation signal (operation data) is input to the CPU core 42 via the I/F circuit 54. Furthermore, operation data output from the touch panel 22 (coordinates data) is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs it from the speaker 32 via the I/F circuit 54.

The wireless communication unit 64 is a communication for wirelessly sending and receiving data with other game apparatus 10. The wireless communication unit 64 modulates communication data to be transmitted to the opponent into a radio signal to send it from an antenna, and receives a radio signal from the opponent by the same antenna to demodulate it to communication data.

In the game machine 10, a shooting game, for example, can be performed. As shown in FIG. 3, in an initial game screen, a plurality of enemy characters 70 are displayed on the upper screen so as to be arranged in a predetermined configuration (e.g., horizontally and vertically). On the lower screen, the same game space as that of the upper screen in which the enemy characters 70 are present is displayed. By operating the touch panel 22 placed over the lower screen, a player generates a bullet object 72 in the game space and moves the bullet object 72 toward an enemy character 70 and shoots down the enemy character 70 which is a shooting target.

In the present embodiment, when an input made on the touch panel 22 satisfies a first condition, generation coordinates where a bullet object 72 is to be generated are determined and the bullet object 72 is generated and displayed in the object generation coordinates. Specifically, as shown in FIG. 4, when a touch input is made on the touch panel 22, i.e., when there is a transition from a touch-off state (a state in which there is no touch input) to a touch-on state (a state in which there is a touch input), the first-touch-input coordinates are set to object generation coordinates and a bullet object 72 is generated and displayed at a position of the lower screen corresponding to the input coordinates. As such, by just touching an arbitrary position on the touch panel 22 of the lower screen with a stick 24 or the like, a bullet object 72 can be easily generated in that position.

Subsequently, as shown in FIG. 5, when the stick 24 or the like being in the touch-on state is slid in a downward direction from the first-touch-input position, a tail 74 of the bullet object 72 is displayed, expressing that the bullet object 72 is ready to be fired. The image of the tail 74 changes so that a touch input position is the position of an end of the tail 74.

Thereafter, as shown in FIG. 6, when the stick 24 or the like is released from the touch panel 22, i.e., when a transition to a touch-off state occurs, the bullet object 72 is moved in a specific direction (an upward direction of the screen in the present embodiment) from the object generation position. The tail 74 is changed so as to extend in the upward direction according to the movement of the bullet object 72. Then, as shown in FIG. 7, when the bullet object 72 collides with an enemy character 70, the enemy character 70 takes damage. If the endurance of the enemy character 70 is lower than the attack power of the bullet object 72, the enemy character 70 can be eliminated. As such, by such a simple operation as performing a series of touch operations from a touch-on to a touch-off, a bullet object 72 can be generated in any free position and can be moved in the specific direction.

Note, however, that a condition (second condition) for causing the bullet object 72 to move is set. Specifically, this movement condition includes that a direction inputted by a continuous touch input is a direction that satisfies a predetermined condition. The input direction is, for example, a movement direction of coordinates detected during continuous detection after the object generation coordinates. The input direction is determined based on the object generation coordinates and at least one set of coordinates detected continuously after the object generation coordinates. When the movement condition is satisfied, the bullet object 72 is moved in the specific direction.

The direction that satisfies the predetermined condition is a specific first direction and the moving direction in this case is the direction opposite to the specific direction, e.g., the first direction. In the present embodiment, the first direction is set to a downward direction (directly downward direction) on a display screen of an LCD 14 over which the touch panel 22 is placed. The moving direction in this case is an upward direction (directly upward direction) on the display screen. By performing an operation such that the generated bullet object 72 is pulled, the bullet object 72 can be fired in the direction opposite to the direction in which the bullet object 72 is pulled, and thus, the bullet object 72 can be intuitively controlled, making it possible to provide the player or user a sense of reality when firing the object 72.

Alternatively, the direction that satisfies the predetermined condition may be a direction having the positive component of the first direction. In the present embodiment, the direction that satisfies the predetermined condition can be any direction having the positive component of the downward direction on the display screen, i.e., the direction that satisfies the predetermined condition is not limited to the directly downward direction and can be any downward direction. The moving direction in this case is also the directly upward direction on the display screen, for example. By making an input in such a wide range that includes the positive component of the first direction, the object can be easily moved in the direction opposite to the first direction.

Alternatively, the direction that satisfies the predetermined condition may fall within a range of less than 90 degrees centering a first direction. In the present embodiment, the direction that satisfies the predetermined condition can fall within a range of less than 90 degrees centering a direction that is direct downward on the display screen, and may be any direction, for example, that falls within a range extending by less than 45 degrees on either side of the direct downward direction. The moving direction in this case is also the directly upward direction on the display screen. By making an input within a relatively wide range extending less than 90 degrees from the first direction to the left and right sides of the first direction from the object generation coordinates, the object can be easily moved in the direction opposite to the first direction.

In the present embodiment, when there is an operation such that the object is pulled in a direction that is considered to be the downward direction, the bullet object 72 is moved in the directly upward direction, even if the direction is shifted from the directly downward direction. As shown in FIG. 3, since in the present embodiment the plurality of enemy characters 70 are arranged in a vertical direction, by setting the moving direction of the bullet object 72 to the directly upward direction, the enemy characters 70 can be easily defeated. As such, by setting the moving direction of an object 72 to be generated to a specific direction that matches or adapts to, for example, the position or direction of a destination of movement of the object 72 or the existing location (position), arrangement, or configuration of other objects 70 that are affected by the movement of the object 72, the achievement of the purpose of movement of the object 72 and the proceeding of the game and application can be facilitated.

In addition, in the present embodiment, as described above, it is determined whether the input direction is a direction satisfying the predetermined condition, i.e., the input direction is considered to be the downward direction on the display screen. To put it in simple words, it is determined whether the input direction is a predetermined direction, i.e., whether an input in the downward direction is made.

Figure 8:
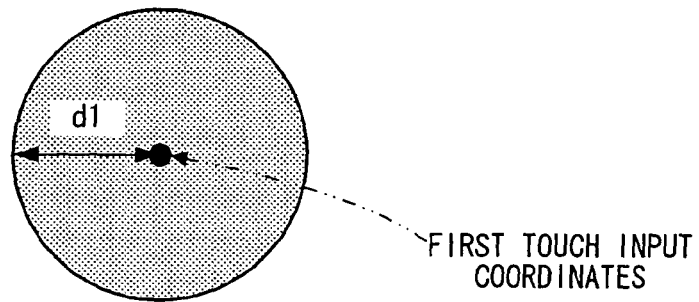
FIG. 8 is an illustrative view for describing a bullet object movement condition and showing a certain distance range from the first-touch-input position.

Specifically, in the present embodiment, first, as shown in FIG. 8, it is determined whether detected input coordinates has moved from the object generation coordinates (the first-touch-input coordinates in the present embodiment) to a point beyond a region of a certain distance d1. The distance d1 is set to 20 dots, for example. When there is an input beyond the certain distance d1, it is interpreted that an input of a direction is made by the player or user.

Figure 9:
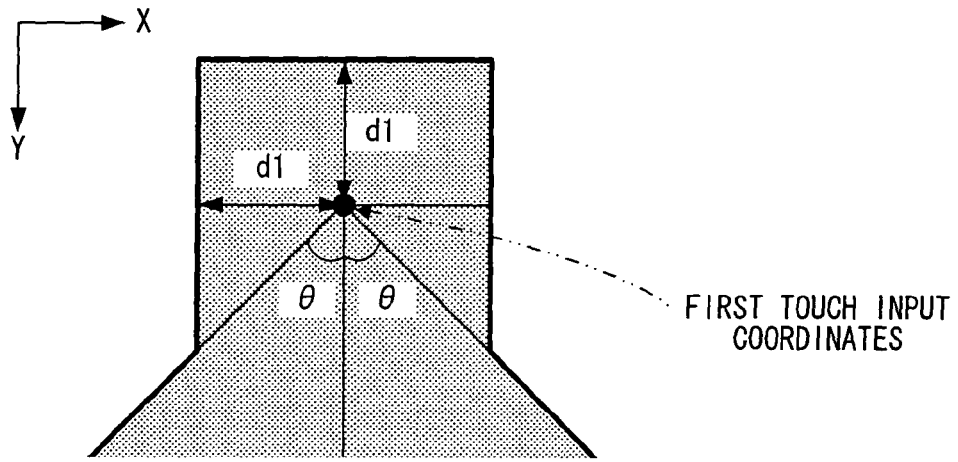
FIG. 9 is an illustrative view for describing the bullet object movement condition and showing a first effective range.

If it is determined that the distance between the input coordinates and the object generation coordinates exceeds a threshold value d1, as shown in FIG. 9, it is determined whether the input coordinates are within a first effective range. Here, a horizontal direction on the display screen of the LCD 14 over which the touch panel 22 is placed is defined as an X-axis direction (the right direction on the screen is a positive X-axis direction) and a vertical direction is defined as a Y-axis direction (the downward direction on the screen is a positive Y-axis direction). The first effective range includes a range extending by a certain distance d1 from the object generation coordinates in both positive and negative X-axis directions and extending by a certain distance d1 from the object generation coordinates in both positive and negative Y-axis directions. Furthermore, the first effective range includes a range extending at an angle of θ with respect to the downward direction (positive Y-axis direction) from the object generation coordinates to both the left and right sides of the downward direction. The angle θ is set to 45 degrees, for example. In the present embodiment, when input coordinates which are continuously detected during a time period from when input coordinates go beyond the certain distance d1 from the object generation coordinates until a touch-off is detected are within the first effective range, it is interpreted that an input in the predetermined direction (the downward direction in the present embodiment) is made. Note that an input made within a range, in the first effective range, extending by the certain distance d1 from the object generation coordinates in the upward direction corresponds to an input on substantially the opposite side of an input in the downward direction which is required in the present embodiment. However, by providing a range in the direction opposite to the input direction, the first effective range includes a region present in all directions from the object generation coordinates. By making a determination using such a somewhat wide first effective range including a region in a direction other than the predetermined direction, shaking of the hand of the user can be absorbed.

Figure 10:
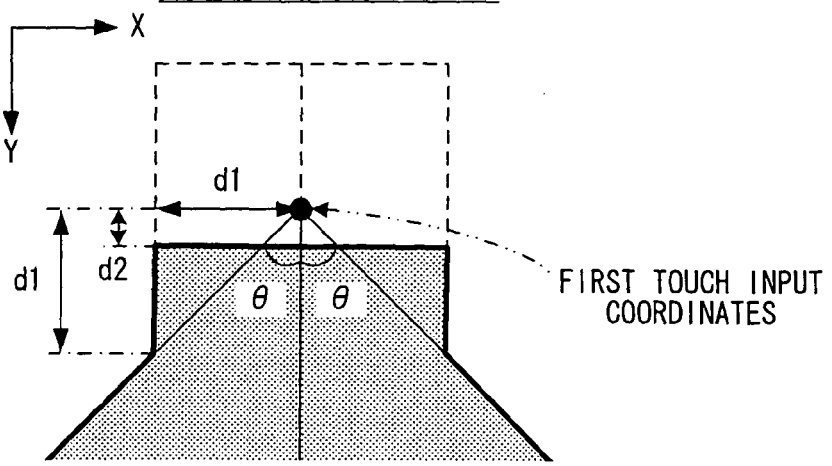
FIG. 10 is an illustrative view for describing the bullet object movement condition and showing a second effective range.

Finally, as shown in FIG. 10, when there is a touch-off, it is determined whether input coordinates immediately before the touch-off are within a second effective range. Specifically, it is determined whether the last one set of input coordinates detected continuously after the object generation coordinates is within the second effective range. The second effective range includes a range of coordinates extending by the certain distance d1 from the object generation coordinates in both positive and negative X-axis directions and extending by the certain distance d1 in a positive Y-axis direction from coordinates displaced downward by a certain distance d2 from the object generation coordinates. Furthermore, the second effective range includes a range extending at an angle of θ with respect to the downward direction (positive Y-axis direction) from the object generation coordinates to both the left and right sides of the downward direction. Note, however, that a range extending by the certain distance d2 from the object generation coordinates in the positive Y-axis direction is excluded. A condition necessary for the input direction to be considered as the downward direction is that coordinates detected upon the touch-off have moved by at least the certain distance d2 from the first-touch-input position (object generation coordinates) in the downward direction. The certain distance d2 is set to 3 dots, for example. Note that in order to ensure that an input is made in the predetermined direction, the second effective range is, unlike the first effective range, present in only the predetermined direction. In the present embodiment, when input coordinates immediately before a touch-off are within the second effective range, it is interpreted that an input in the predetermined direction (the downward direction in the present embodiment) is made.

In the present embodiment, in order to determine whether an input is made in the downward direction which is the direction opposite to the moving direction (upward direction) of the bullet object 72, the aforementioned first and second effective ranges which extend in the downward direction from the object generation coordinates are set. However, in another embodiment, when an input in another direction is required, first and second effective ranges which extend in that another direction are set. For example, the first effective range is set to include a range extending at an angle of θ with respect to a predetermined direction from object generation coordinates. The second effective range is provided to include a range extending at an angle of θ with respect to the predetermined direction from the object generation coordinates, excluding a range extending by the certain distance d2 from the object generation coordinates in the predetermined direction.

As such, since an evaluation is made in two steps, the first effective range of FIG. 9 and the second effective range of FIG. 10, it is possible to correctly determine whether an input in the predetermined direction is made. The first effective range of FIG. 9 is a region for determining coordinates continuously detected during a time period from when object generation coordinates are determined until there is a touch-off. When an input made outside of the first effective range is detected, the generation of an object is canceled and the object is eliminated. In other words, it can be said that the first effect range is to define a range where a generated object is eliminated. The second effective range of FIG. 10 is a region for determining coordinates detected upon a touch-off (i.e., input coordinates immediately before a touch-off). If the input coordinates immediately before the touch-off are within the second effective range, the generated object is fired. That is, it can be said that the second effective range is to define a range where the object is fired.

In the present embodiment, as described above, at the time when coordinates which are detected during continuous detection after the object generation coordinates are no longer within the first effective range, it is immediately determined that an input in the predetermined direction is not made. However, in another embodiment, even when, in the process of continuous detection, detected coordinates are no longer present in a predetermined direction range (first effective range) with the predetermined direction being the center, if, for example, coordinates detected at the time of a touch-off are present in the predetermined direction range (second effective range), it may be determined that an input in the predetermined direction is made.

In addition, in the present embodiment, by performing an operation such that a bullet object 72 is pulled down to back, the bullet object 72 is fired up to the front, and thus, an input in the direction opposite to the moving direction of the bullet object 72 is required. In another embodiment, however, an input in the same direction as the moving direction of the bullet object 72 may be required. In this case, a first effective range and a second effective range are set so as to include directions within a range extending at an angle of a predetermined angle with respect to the same direction as the object moving direction from the object generation coordinates. By performing an operation such that a bullet object 72 is pushed up to the front, the bullet object 72 is fired up to the front.

Figure 11:
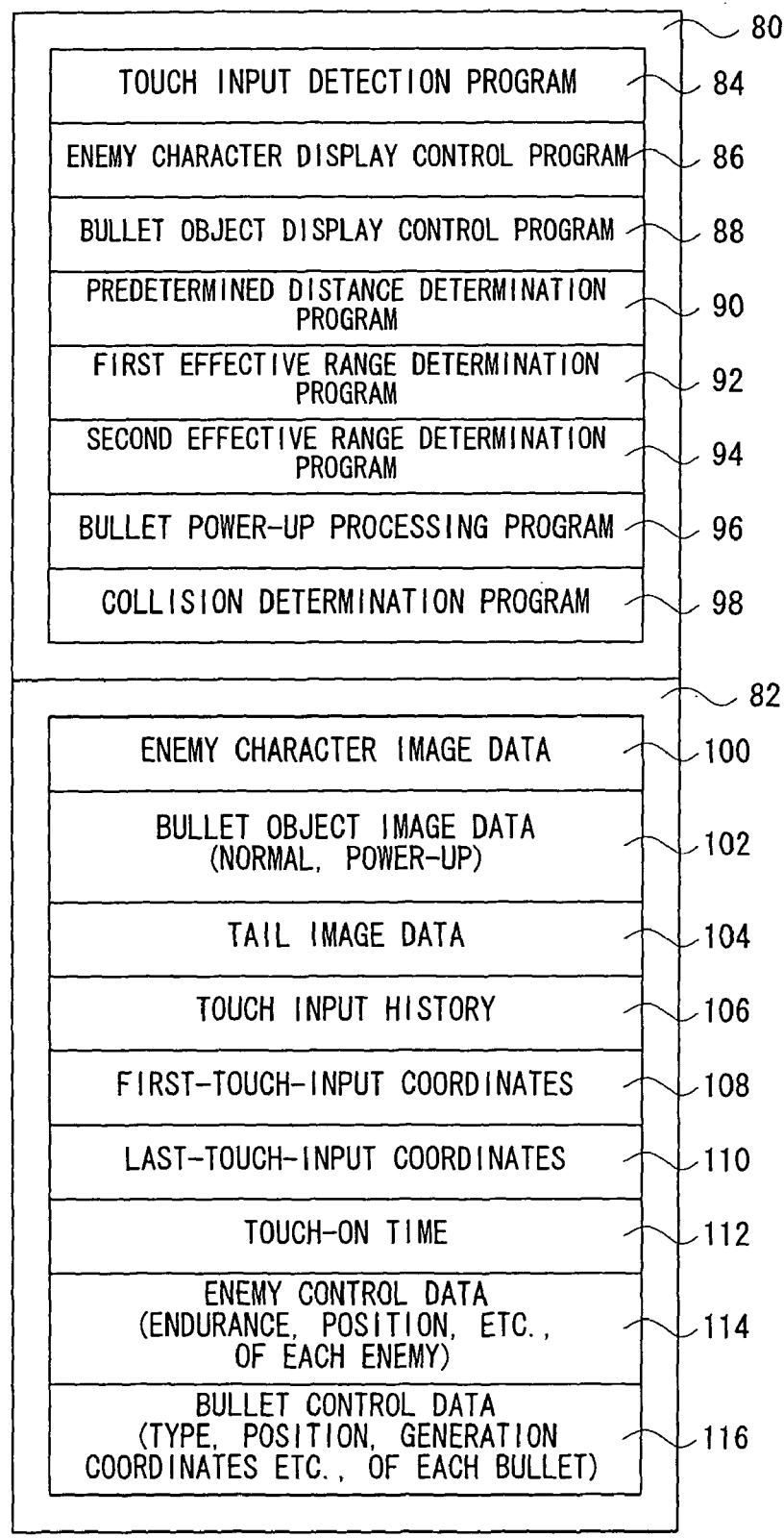
FIG. 11 is an illustrative view showing an exemplary RAM memory map.

FIG. 11 shows an exemplary memory map of the RAM 48. The RAM 48 includes a program storage region 80 and a data storage region 82. Note that FIG. 11 shows only part of the memory map, and various programs and data which are required to proceed a game and an application are stored therein.

A touch input detection program storage region 84 stores a program for detecting operation data (touch input data) from the touch panel 22. Touch input data is detected, for example, at certain time intervals (e.g., every display frame).

An enemy character display control program storage region 86 stores a program for controlling display of enemy characters 70. By this program, the movement, state, arrangement, and the like of the enemy characters 70 are controlled.

Control data which includes the position coordinates in a game space, display position coordinates on the display screen, characteristics, and the like of the enemy characters 70 is also controlled by this program. The enemy characters 70 are first displayed on the upper screen, as shown in FIG. 3, for example, and then repeat movement in the horizontal direction and movement in the downward direction. If the endurance of an enemy character 70 becomes zero, the enemy character 70 is eliminated there. If the endurance of an enemy character 70 does not become zero and the enemy character 70 reaches the bottom of the lower screen, the enemy character 70 moves out of the screen and is eliminated.

A bullet object display control program storage region 88 stores a program for controlling display of a bullet object 72. By this program, the generation, movement, state, and the like of the bullet object 72 are controlled. For example, control data which includes the generation coordinates, position coordinates in a game space, display position coordinates on the display screen, type, movement parameter, and the like of the bullet object 72 is also controlled by this program. The bullet object 72 is controlled as follows. The bullet object 72 is generated when the first condition is satisfied, as described above. When an input direction based on coordinates which are continuously detected after the first condition is satisfied satisfies the predetermined condition, the position of the bullet object 72 thereafter is moved in the specific direction (upward direction). Here, the coordinates which are continuously detected are meant to refer to coordinates which are detected in a state in which, after the detection of object generation coordinates, there is continuous detection, without going into a state in which there is no detection. Note that when, before a certain time period has elapsed after detection is over, detection occurs again, it can be considered to be continuous detection. If the bullet object 72 collides with an enemy characters 70 and the attack power of the bullet object 72 becomes zero, the bullet object 72 is eliminated there. If the attack power does not become zero and the bullet object 72 reaches the top of the upper screen, the bullet object 72 moves out of the screen and is eliminated. When the first condition is further satisfied before the bullet object 72 is eliminated, another bullet object 72 which is different from the previously generated bullet object 72 is generated in object generation coordinates determined for that bullet object 72. When an input direction based on coordinates which are continuously detected after the detection of the object generation coordinates satisfies the predetermined condition, the new bullet object 72 is moved in the specific direction.

A certain distance determination program storage region 90 stores a program for determining whether input coordinates are beyond the certain distance region (FIG. 8) from generation coordinates of a bullet object 72 (input coordinates upon the start of the touch).

A first effective range determination program storage region 92 stores a program for determining, when input coordinates are determined by the certain distance determination program to be beyond the certain distance range, whether the input coordinates are within the first effective range (see FIG. 9) which is set based on object generation coordinates.

A second effective range determination program storage region 94 stores a program for determining whether input coordinates immediately before a touch-off are within the second effective range (see FIG. 10) which is set based on object generation coordinates.

A bullet power-up processing program storage region 96 stores a program for changing the type of bullet object 72. In the present embodiment, when a duration of a touch input made in the aforementioned certain distance region exceeds a certain time period, the type of bullet object 72 is changed, for example, from a normal state to a power-up state. Furthermore, according to the change of the type of bullet object 72, characteristics such as attack power and moving speed are also changed; for example, the attack power is increased and the moving speed is increased. Alternatively, the configuration may be such that the longer the input duration the greater the values of the attack power and moving speed. Accordingly, when, for example, the touch input duration exceeds the certain time period, upon collision with an enemy character 70, a value to be subtracted from the endurance of the enemy character 70 becomes large. Note that in the present embodiment when the touch input duration exceeds the certain time period, the bullet object 72 powers up and its attack power, moving speed, etc., are increased; on the other hand, in another embodiment, when the touch input duration exceeds the certain time period, the bullet object 72 may, in contrast, power down and its attack power, moving speed etc., may be reduced. The moving speed is one element of a parameter for controlling the movement of the bullet object 72. By the bullet power-up processing program, the bullet object display control program, etc., the value of a parameter for movement of the bullet object 72 is controlled. The parameter may include, in addition to the moving speed, a moving direction and a moving distance, for example. Based on the movement parameter, the movement of the bullet object 72 can be controlled.

A collision determination program storage region 98 stores a program for determining whether a bullet object 72 collides with an enemy character 70. A determination for collision is made based on position data on the bullet object 72 and position data on the enemy character 70.

An enemy character image data storage region 100 stores image data for displaying enemy characters 70. A bullet object image data storage region 102 stores image data for displaying a bullet object 72. In the bullet object image data storage region 102, image data for different types (e.g., normal and power-up) of the bullet object 72 is stored. A tail image data storage region 104 stores image data for displaying a tail 74 to be added to an image of a bullet object 72.

A touch input history storage region 106 stores data on a history of touch input data which is detected by the touch input detection program. For example, data indicating whether there is a touch input in the current and previous frames and data on detected coordinates are stored.

A first-touch-input coordinate storage region 108 stores data on coordinates which are detected when a touch input starts. A last-touch-input coordinate storage region 110 stores data on coordinates which are last detected continuous touch input coordinates. A touch-on time storage region 112 stores data on time when a touch input starts.

An enemy control data storage region 114 stores control data on each enemy character 70. The control data includes, for example, characteristics data indicating endurance (physical strength), a type, etc., and position coordinate data. The endurance of an enemy character 70 may vary with the type of enemy character 70 or may vary not with the type but with individuals.

A bullet control data storage region 116 stores control data on a bullet object 72. When a plurality of bullet objects 72 are generated, control data is stored so as to be associated with each bullet object 72. The control data includes, for example, characteristics data indicating a type, an attack power, a moving speed, etc., position coordinate data, and generation coordinate data. In the present embodiment, for example, as shown in FIG. 12, bullet characteristics table data indicating characteristics values such as an attack power and a moving speed is stored in advance in the ROM 28a so as to be associated with the type of bullet object 72. When the type of bullet object 72 is set to a normal state, a normal attack power and a normal moving speed are set. When the type of bullet object 72 is set to a power-up state, a high attack power and a high moving speed are set.

Figure 13:
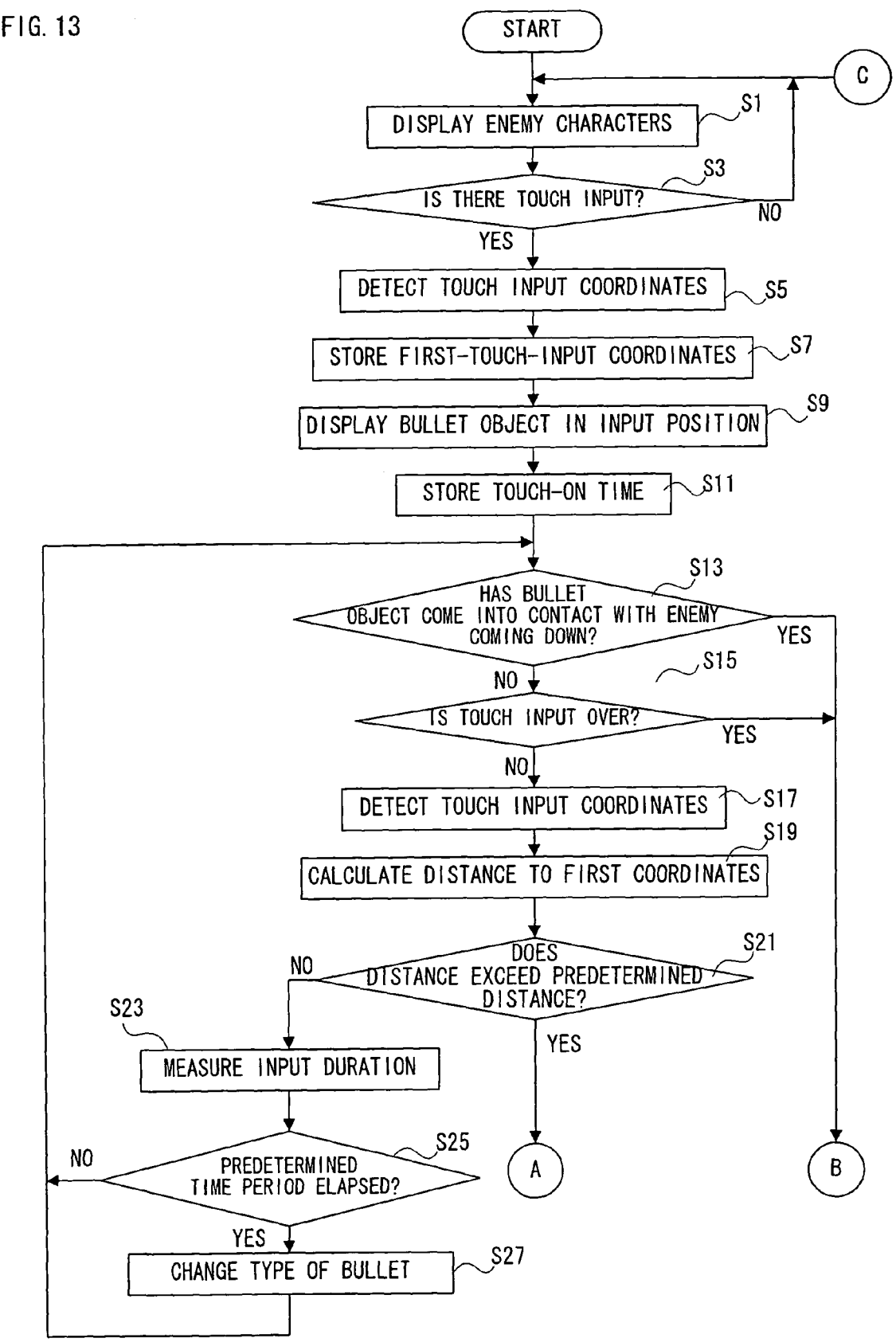
FIG. 13 is a flowchart showing part of an exemplary operation of an object control process performed by the information processing apparatus according to the embodiment of FIG. 1.
Figure 14:
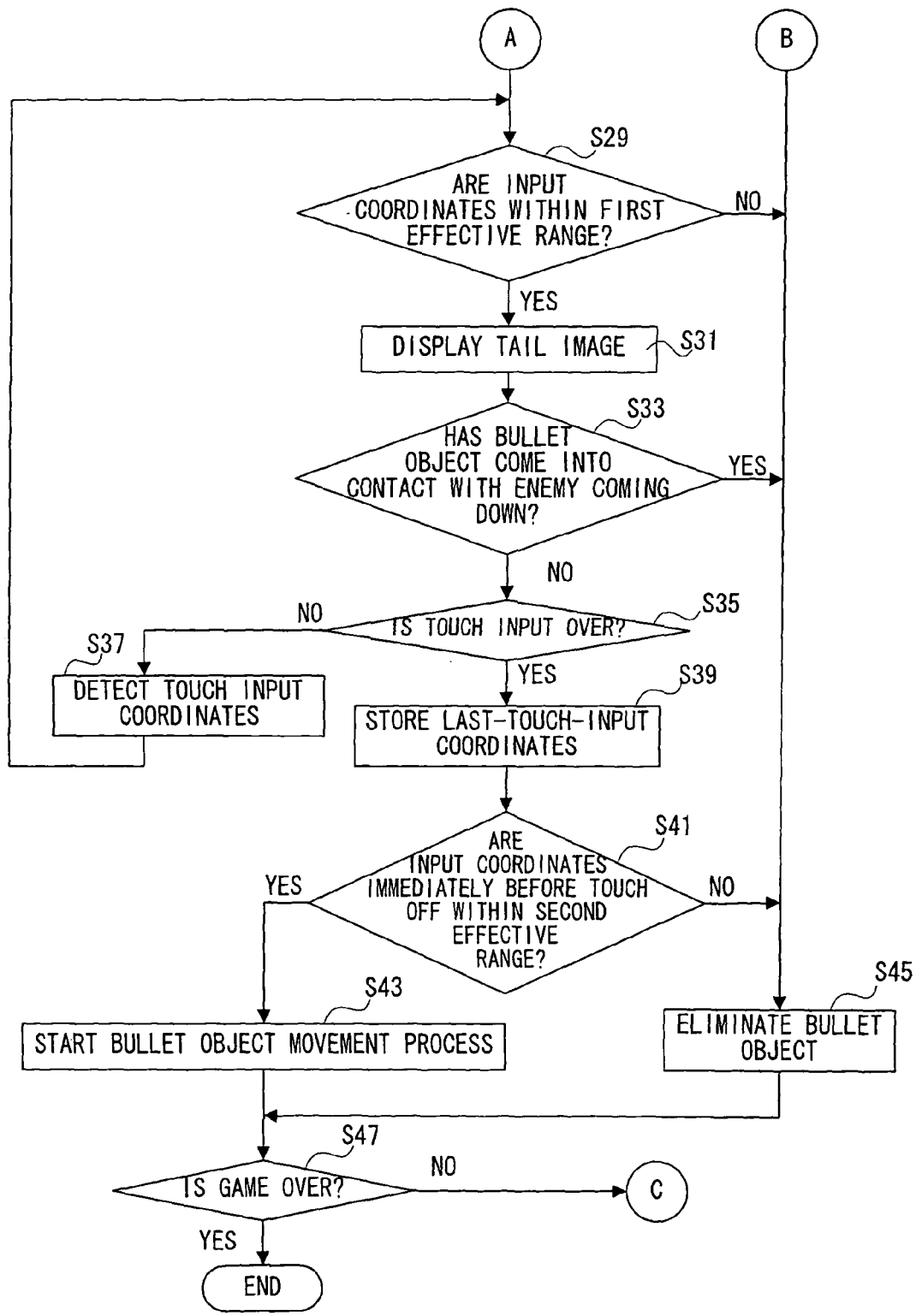
FIG. 14 is a flowchart continued from the flowchart of FIG. 13.

An exemplary operation of the game machine 10 according to the present embodiment is shown in FIGS. 13 and 14. At S1 of FIG. 13, the CPU core 42 displays enemy characters 70. Specifically, by using the GPU 50 or 52, the CPU core 42 generates in the VRAM 56 or 58 data on a game screen which contains enemy characters 70, based on image data on the enemy characters, enemy control data, and the like. Then, by using the LCD controller 60, the CPU core 42 displays the game screen which contains the enemy characters 70 on the LCD 12. Note that at S1 the initial value of enemy control data including the endurance data and position coordinate data on each enemy character 70 is read from the ROM 28a and stored (set) in the enemy control data storage region 114.

Then, at S3, the CPU core 42 determines whether there is a touch input. For example, the CPU core 42 obtains operation data on the touch panel 22 from a buffer in the I/F circuit 54 and detects whether there is data indicating a touch-on state. Specifically, at this step, the CPU core 42 determines whether there is a transition from a touch-off state (a state in which there is no input to the touch panel 22) to a touch-on state (a state in which there is an input to the touch panel 22). That is, a determination is made for the first condition for generating a bullet object 72 in the present embodiment. If the determination at S3 is "NO", then the process returns to S1 and the CPU core 42 updates the display of the enemy characters 70.

On the other hand, if the determination at S3 is "YES", i.e., when the first condition is satisfied, then at S5 the CPU core 42 detects touch input coordinates from the operation data on the touch panel 22 and stores the touch input coordinates in the touch input history storage region 106. Note that in the touch input history storage region 106 not only coordinate data but also data indicating a touch-on or a touch-off may be stored.

At S7, the CPU core 42 stores the detected coordinates in the first-touch-input coordinate storage region 108. The input coordinates detected when the first condition is satisfied are determined to be generation coordinates of the bullet object 72 and are also stored as the object generation coordinates of the bullet object 72 in the bullet control data storage region 116.

Furthermore, at S9, the CPU core 42 displays a bullet object 72 in the input position (generation coordinates). Specifically, by using the GPU 50 or 52, the CPU core 42 generates in the VRAM 56 or 58 data on a game screen which contains the bullet object 72, based on image data on the bullet object, bullet control data, and the like. Then, by using the LCD controller 60 and the like, the CPU core 42 displays the game screen which contains the bullet object 72 on the LCD 14. For an image of the bullet object 72, image data indicating a normal state is used.

At S11, the CPU core 42 obtains time information on when the first condition is satisfied from a timepiece IC (not shown) and stores the time information in the touch-on time storage region 112.

Subsequently, at S13, the CPU core 42 determines whether the bullet object 72 has come into contact with an enemy character 70 coming down, based on position data on the bullet object 72 and position data on the enemy character 70. If the determination at S13 is "YES", then the process proceeds to S45 of FIG. 14 to eliminate the bullet object 72.

If the determination at S13 is "NO", then at S15 the CPU core 42 obtains touch input data from the buffer in the I/F circuit 54 and determines whether the touch input is over. That is, the CPU core 42 detects whether there is data indicating a touch-off state. If the determination at S15 is "YES", then the CPU core 42 considers that the firing of the bullet object 72 is canceled and thus the process proceeds to S45 of FIG. 14.

If the determination at S15 is "NO", i.e., when the touch input continues, then at S17 the CPU core 42 detects, as in S5, touch input coordinates and stores the touch input coordinates in the touch input history storage region 106.

Subsequently, at S19, the CPU core 42 calculates a distance between the input coordinates detected in the current frame and the first coordinates stored in the first-touch-input coordinate storage region 108. Then, at S21, the CPU core 42 determines whether the calculated distance exceeds a certain distance. That is, the CPU core 42 determines whether a touch is made outside the certain distance range (FIG. 8) from the input coordinates (object generation coordinates) detected upon the touch-on.

If the determination at S21 is "NO", i.e., when a touch is continuously made within the certain distance range from the coordinates detected when the touch input starts, then at S23 the CPU core 42 measures an input duration based on the time when the input starts, which is stored in the touch-on time storage region 112, and the current time obtained from the timepiece IC. Then, at S25, the CPU core 42 determines whether the input duration exceeds a certain time period, i.e., whether the certain time period has elapsed. If the determination at S25 is "NO", then the process returns to S13.

If the determination at S25 is "YES", i.e., a touch is continuously made over the certain time period within the certain distance range from the object generation coordinates, then at S27 the CPU core 42 changes the type of the bullet object 72. Specifically, the CPU core 42 updates type data contained in the bullet control data on the bullet object 72 from data indicating normal to data indicating power-up. By this, attack power data on the bullet object 72 is changed from its normal value to a high value and moving speed data is changed from its normal value to a high value. Thus, since the longer the time for which the detected coordinates have been continuously present within the certain distance region from the object generation coordinates, the higher the attack power is made, the value to be subtracted from the endurance of a collided enemy character 70 becomes large. Furthermore, the image of the bullet object 72 is changed from a normal-state image to a power-up state image and a game screen which displays the bullet object 72 being in the power-up state in the object generation coordinates is generated and displayed on the LCD 14. When S27 is completed, the process returns to S13.

On the other hand, if the determination at S21 is "YES", i.e., the touch input position moves outside of the certain distance range from the object generation coordinates, then the process proceeds to S29 of FIG. 14.

In the present embodiment, a determination as to whether an input direction which is determined based on input coordinates detected upon a touch-on and coordinates continuously detected after the detection of the input coordinates is a predetermined direction (downward direction) is made at this S21 and the steps S29 and S41 which will be described later.

At S29 of FIG. 14, the CPU core 42 determines whether the input coordinates detected when the input position goes outside of the certain distance range are within the first effective range. The first effective range is, as described above, a region such as the one shown in FIG. 9 which is calculated based on the input coordinates detected when the touch input starts and the constants d1 and θ. In the present embodiment, the first effective range is defined to enable detection of an attempt to input in the downward direction. If the determination at S29 is "NO", then the CPU core 42 considers that the input is not made in the downward direction and thus the process proceeds to S45.

If the determination at S29 is "YES", i.e., an attempt to input in the downward direction is detected, then at S31 the CPU core 42 displays, using the GPU 50 or 52 and the LCD controller 60 and the like, an image of a tail 74 on the LCD 14 so as to be adjacent to the bullet object 72. Note that the tail 74 is displayed such that its end is positioned in the current input coordinates.

At S33, the CPU core 42 determines, as in the aforementioned S13, whether the bullet object 72 has come into contact with an enemy character 70 coming down. If the determination at S33 is "YES", then the process proceeds to the S45.

If the determination at S33 is "NO", then at S35 the CPU core 42 determines, as in the aforementioned S15, whether the touch input is over. If the determination at S35 is "NO", i.e., the touch input continues, then at S37 the CPU core 42 detects, as in the aforementioned S5, touch input coordinates and stores the touch input coordinates in the touch input history storage region 106. When S37 is completed, the process returns to S29. In this manner, until the touch input is over, the CPU core 42 detects whether the input within the first effective range which is considered to be an input in the downward direction continues. When there is an input outside of the first effective range, i.e., when it can be considered that an input in the downward direction is not made, the firing of the bullet object 72 is canceled.

On the other hand, if the determination at S35 is "YES", i.e., a touch-off operation is detected, then at S39 the CPU core 42 stores in the last-touch-input coordinate storage region 110 touch input coordinates detected immediately before the touch-off which are stored in the touch input history storage region 106.

Then, at S41, the CPU core 42 determines whether the input coordinates detected immediately before the touch-off, i.e., the last-touch-input coordinates, are within the second effective range. The second effective range is, as described above, a region such as the one shown in FIG. 10 which is calculated based on the input coordinates detected when the touch input starts and the constants d1, d2 and θ. In the present embodiment, the second effective range is defined to enable detection of completion of the input in the downward direction.

If the determination at S41 is "YES", i.e., it is determined that an input in the downward direction is made, then at S43 the CPU core 42 starts a bullet object movement process. The CPU core 42 performs the bullet object movement process in parallel with other processes (FIGS. 13 and 14, etc.). By the bullet object movement process, a game process such as movement of the bullet object 72 and collision with an enemy character 70 is performed. As such, processes, such as the detection of a touch input, the generation of a bullet object 72, and the determination of an input direction, and a bullet object movement process are performed in parallel. A bullet object movement process is performed for each generated bullet object 72 and a plurality of bullet object movement processes can be performed in parallel. Therefore, when, while a previously generated bullet object 72 is being moved by a bullet object movement process for the previously generated bullet object 72, a touch-on is detected, another bullet object 72 is generated. Furthermore, when a firing condition is satisfied, a bullet object movement process for the new bullet object 72 is performed. An exemplary operation of the bullet object process will be described in detail in FIG. 15 which will be described later.

If the determination at S41 is "NO", i.e., a touch-off operation is performed outside the second effective range, then the CPU core 42 considers that an input in the downward direction is not made, and thus, the process proceeds to S45. At S45, the CPU core 42 eliminates the bullet object 72 from the game screen. Specifically, for example, the CPU core 42 clears control data on the bullet object 72 which is stored in the bullet control data storage region 116. In addition, the CPU core 42 generates, using the GPU 50 or 52, a game screen in which the bullet object 72 and the tail 74 are not present and then displays the game screen on the LCD 14 by using the LCD controller 60 and the like.

When a movement process is started at S43 or S45 is completed, the CPU core 42 determines at S47 whether the game is over. If the determination at S47 is "NO", then the process returns to S1 of FIG. 13 and the process of the game continues. Hence, when, before a previously generated bullet object 72 is eliminated, a touch input is started again and a direction that satisfies the predetermined condition is inputted, another bullet object 72 which is different from the previously generated bullet object 72 is generated and moved in the specific direction. On the other hand, if the determination at S47 is "YES", then the CPU core 42 ends the game process.

Figure 15:
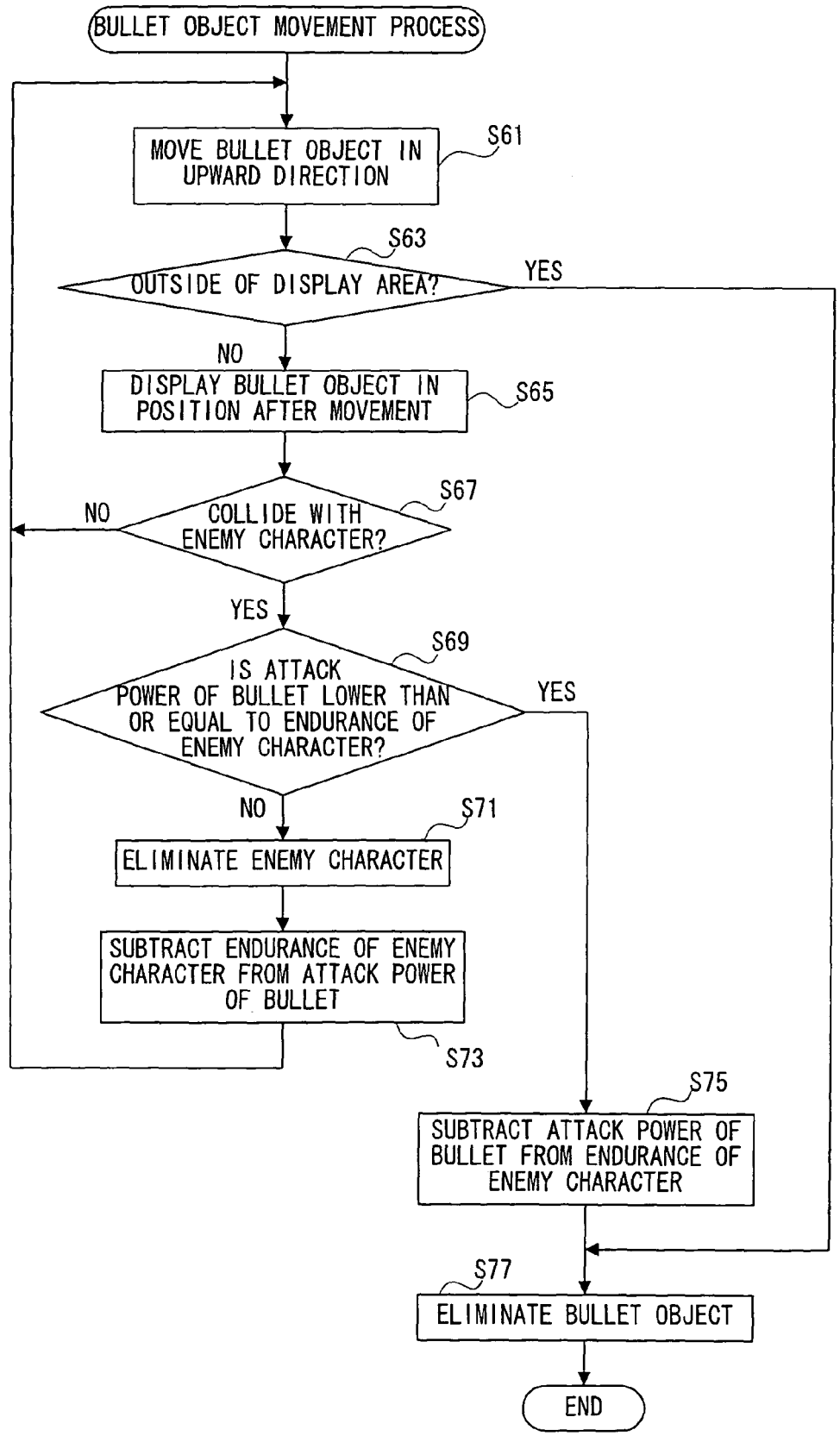
FIG. 15 is a flowchart showing an exemplary operation of a bullet object movement process of FIG. 14.

FIG. 15 shows an exemplary operation of the bullet object movement process which is started at S43 of FIG. 14. At a first S61 of FIG. 15, the CPU core 42 moves the bullet object 72 in a specific direction. In the present embodiment, the specific direction is fixed to the upward direction which is the direction opposite to the downward direction which is the input direction. For example, the CPU core 42 calculates position coordinates after the movement of the bullet object 72 (position coordinates after a lapse of a certain time period (one frame)) based on position coordinates and a moving speed which are stored in the bullet control data storage region 116.

Then, at S63, the CPU core 42 determines whether the position after movement is outside of a display area of the display screen. If the determination at S63 is "YES", then the process proceeds to S77.

If the determination at S63 is "NO", then at S65 the CPU core 42 displays the bullet object 72 at the position after movement. For example, the CPU core 42 updates position data on the bullet object 72 stored in the bullet control data storage region 116 to the position coordinates after movement which are calculated at S61. Then, the CPU core 42 generates data on a game screen which displays the bullet object 72 at the position after movement and then displays the game screen on the LCD 12 or 14.

Subsequently, at S67, the CPU core 42 determines whether the bullet object 72 collides with an enemy character 70, based on position data on the bullet object 72 and position data on the enemy character 70. For example, the CPU core 42 determines whether the distance between the bullet object 72 and each enemy character 70 is less than or equal to a threshold value, or determines whether the position coordinates of the bullet object 72 are contained in a display area of any of the enemy characters 70. If the determination at S67 is "NO", then the process returns to S61.

On the other hand, if the determination at S67 is "YES", then at S69 the CPU core 42 determines whether the attack power of the bullet object 72 is lower than or equal to the endurance of an enemy character 70 to be collided, based on attack power data on the bullet object 72 and endurance data on the enemy character 70 to be collided.

If the determination at S69 is "NO", i.e., the attack power of the bullet object 72 exceeds the endurance of the enemy character 70 to be collided, then at S71 the CPU core 42 eliminates the enemy character 70 to be collided. For example, the CPU core 42 clears control data on the enemy character 70 to be collided which is stored in the enemy control data storage region 114. In addition, the CPU core 42 generates data on a game screen in which the enemy character 70 explodes and is gone and then displays the game screen on the LCD 12 or 14.

At S73, the CPU core 42 subtracts the endurance of the collided enemy character 70 from the attack power of the bullet object 72 and updates the attack power data on the bullet object 72 to the calculated value. When S73 is completed, the process returns to S61.

On the other hand, if the determination at S69 is "YES", i.e., the endurance of the enemy character 70 to be collided exceeds the attack power of the bullet object 72, then at S75 the CPU core 42 subtracts the attack power of the bullet object 72 from the endurance of the enemy character 70 and updates the endurance data on the enemy character 70 to the calculated value.

Then, at S77, the CPU core 42 eliminates, as in the aforementioned S45, the bullet object 72 outside of the display screen or at a location of the collision. When S77 is completed, the CPU core 42 ends the bullet object movement process.

According to the present embodiment, in response to start of a touch input, a bullet object 72 is generated in the input start position, and furthermore, when continuously detected inputs are determined to be inputs in a first predetermined direction (e.g., the downward direction), the bullet object 72 is moved in a specific direction (e.g., the direction opposite to the first direction). As such, by such a simple operation as performing a series of continuous inputs from a touch-on to a touch-off, a bullet object 72 can be generated in an arbitrary position and the bullet object 72 can be moved in the specific direction with the generation position being a starting point. Hence, for example, the strategic characteristics of a shooting game can be improved. Furthermore, by a simple, intuitive operation, multiple bullet objects 72 can be continuously generated and moved and thus a feeling of exhilaration can be obtained, providing a game that even beginners can easily enjoy.

In the aforementioned embodiment, when it is determined at S21 that coordinates which are continuously detected after the object generation coordinates are outside of the predetermined distance range from the object generation coordinates, then at S43, a bullet object movement process starts. When it is determined at S29 that the coordinates which are continuously detected after the object generation coordinates are within the first effective range, i.e., when the movement direction of the continuously detected coordinates is the predetermined direction with respect to the object generation coordinates, then at S43, a bullet object movement process starts. That is, under condition that coordinates which are detected during continuous detection after the object generation coordinates are determined to satisfy a predetermined condition (third condition), movement control of a bullet object 72 is performed. However, the predetermined condition (third condition) may be appropriately changed. For example, the third condition may be that the amount of change in continuously detected coordinates is less (or greater) than a threshold value (i.e., the movement speed of input coordinates is lower or higher than a predetermined threshold value), or that continuously detected coordinates do not change for a predetermined time period (i.e., input coordinates have stopped for a predetermined time period).

In addition, in the aforementioned embodiment, when it is determined at S15 that detection is over, before determined at S21 that coordinates which are continuously detected after the object generation coordinates are outside of the predetermined distance range from the object generation coordinates, movement control of a generated bullet object 72 is canceled and the bullet object 72 is eliminated at S45. When it is determined at S29 that coordinates which are continuously detected after the object generation coordinates are outside of a predetermined region (first effective range), or when it is determined at S41 that the last set of continuously detected coordinates are outside of a predetermined region (second effective range), i.e., when it is determined that the movement direction of the continuously detected coordinates is not within a range, for example, where the movement direction is considered to be the predetermined direction with respect to the object generation coordinates, a generated bullet object 72 is eliminated at S45 so that the bullet object 72 cannot be moved. As such, when coordinates which are detected during continuous detection after the object generation coordinates are determined to satisfy a predetermined condition (fourth condition), a bullet object 72 is eliminated. However, the predetermined condition (fourth condition) may be appropriately changed. For example, the fourth condition may be that before the second condition is satisfied and the movement of an object starts, detection is over. Alternatively, the fourth condition may be that the changing amount in continuously detected coordinates is less (or greater) than a threshold value, or that continuously detected coordinates do not change for a predetermined time period.

Furthermore, in the aforementioned embodiment, when the predetermined direction that satisfies the predetermined condition is inputted, a bullet object 72 is moved in the specific direction. However, as in another embodiment which will be described next, a moving direction may be determined based on an input direction and a bullet object 72 may be moved in the moving direction.

Figure 16:
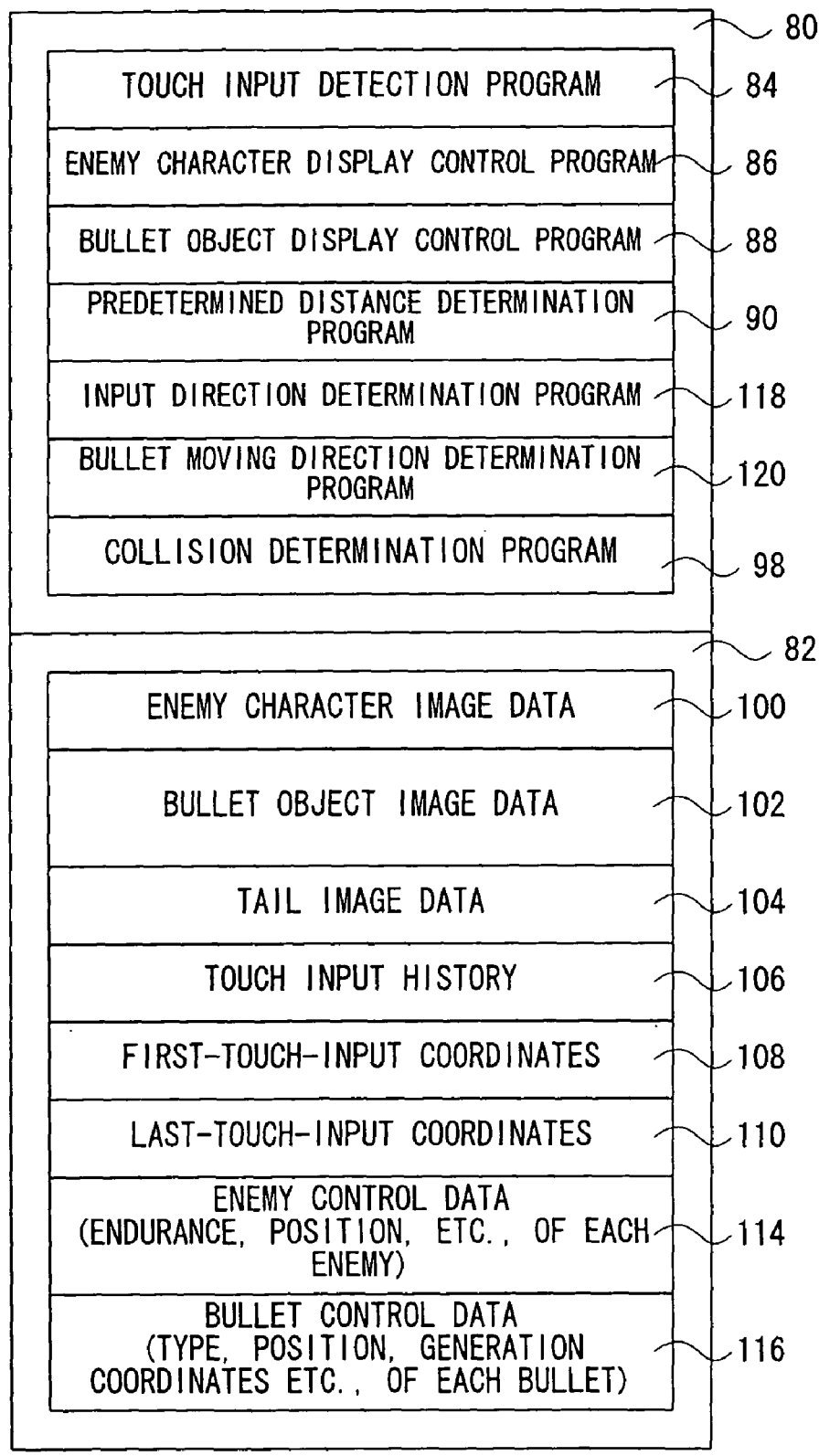
FIG. 16 is an illustrative view showing an exemplary RAM memory map according to another embodiment.

FIG. 16 shows an exemplary memory map according to another embodiment. A program storage region 80 includes a touch input detection program storage region 84, an enemy character display control program storage region 86, a bullet object display control program storage region 88, a certain distance determination program storage region 90, an input direction determination program storage region 118, a bullet moving direction determination program storage region 120, a collision determination program storage region 98, and etc. A data storage region 82 includes an enemy character image data storage region 100, a bullet object image data storage region 102, a tail image data storage region 104, a touch input history storage region 106, a first-touch-input coordinate storage region 108, a last-touch-input coordinate storage region 110, an enemy control data storage region 114, a bullet control data storage region 116, and etc. Note that the description of parts overlapping with those in the aforementioned embodiment (FIG. 11) is omitted here.

The input direction determination program storage region 118 stores a program for determining or detecting a direction inputted. The input direction is determined based on at least one set of coordinates which are continuously detected after the object generation coordinates and the object generation coordinates. The object generation coordinates are, as in the aforementioned embodiment, input coordinates to be detected when the first condition is determined to be satisfied, i.e., in the present embodiment, input coordinates detected when a touch input starts. The input direction is specifically determined based on coordinates detected during a time period from when the first condition is determined to be satisfied until the second condition is determined to be satisfied. In the present embodiment, a direction that connects object generation coordinates with coordinates which are detected when input coordinates continuously detected after the detection of the object generation coordinates are determined to satisfy the second condition is determined to be an input direction. For example, the second condition is that a touch-off state occurs after coordinates are inputted outside of a certain distance range from the object generation coordinates. Thus, in the present embodiment, a direction that connects input coordinates detected upon a touch-on with input coordinates detected immediately before a touch-off is an input direction.

The moving direction determination program storage region 120 stores a program for determining a moving direction of a bullet object 72 based on an input direction. In the present embodiment, the reversed direction of an input direction is set to a moving direction. Note that the moving direction based on an input direction is not limited to the opposite direction; for example, the moving direction may be a direction rotated by a predetermined angle.

As such, since the moving direction is not a fixed direction but is determined based on an input direction, the moving direction can vary between bullet objects 72. Therefore, in the bullet control data storage region 116, data on a moving direction determined by the moving direction determination program is stored for each bullet object 72 along with position data, generation coordinate data, etc.

The bullet object display control program controls the movement of a bullet object 72 based on the moving direction determined for each bullet object 72 and updates control data on the position coordinates, etc., of the bullet object 72. A bullet object 72 is moved, for example, in a moving direction obtained when the aforementioned second condition is determined to be satisfied. As in the aforementioned embodiment, when, before a previously generated bullet object 72 is eliminated, the first and second conditions are satisfied again, another bullet object 72 is generated and moved. Thus, a plurality of bullet objects 72 can be simultaneously displayed on a game screen and the bullet objects 72 can be generated in different generation coordinates and moved in different directions.

Figure 17:
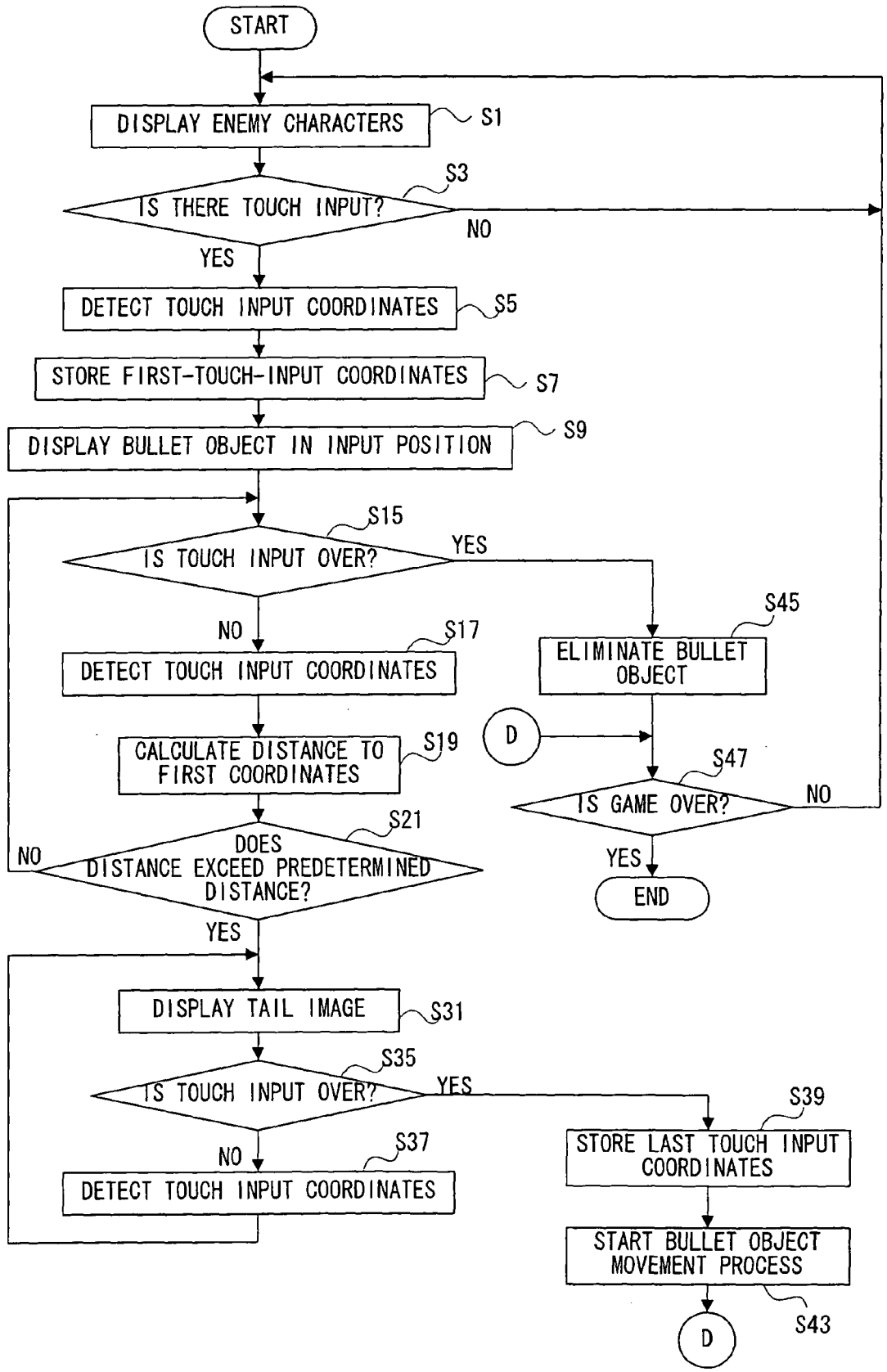
FIG. 17 is a flowchart showing part of an exemplary operation of an object control process performed by an information processing apparatus according to the another embodiment.

FIG. 17 shows an exemplary operation of a game machine 10 according to another embodiment. Note that in FIG. 17 the same or similar processing steps are denoted by the same or similar reference numerals as those in the aforementioned embodiment of FIGS. 13 and 14. Here, a detailed description of each is omitted and the flow of an operation differing from that in the aforementioned embodiment is simply described.

At S1 of FIG. 17, the CPU core 42 displays enemy characters 70 on, for example, the LCD 12. Note that in this another embodiment the enemy characters 70 move only in the horizontal direction and do not come down in the downward direction. Then, at S3, the CPU core 42 determines based on operation data on the touch panel 22 whether there is a touch input. If the determination at S3 is "NO", then the process returns to S1.

If the determination at S3 is "YES", i.e., a touch input has started, then at S5 the CPU core 42 detects touch input coordinates from the operation data and stores the input coordinates in the touch input history storage region 106. Then, at S7, the CPU core 42 stores the input coordinates in the first-touch-input coordinate storage region 108. At S9, the CPU core 42 displays on the LCD 14 a game screen in which a bullet object 72 is arranged in an input position.

Subsequently, at S15, the CPU core 42 determines whether the touch input is over. If the determination at S15 is "YES", then the CPU core 42 considers that the input is canceled and thus eliminates the bullet object 72 at S45, whereby the process proceeds to S47.

On the other hand, if the determination at S15 is "NO", then the CPU core 42 detects touch input coordinates at S17, calculates, at S19, a distance between the current input coordinates and the first-touch-input coordinates, and determines, at S21, whether the distance exceeds a certain distance. If the determination at S21 is "NO", then the process returns to S15.

Note that in the present embodiment, an example case is described in which the type of bullet object 72 is fixed; however, in a variant, for example, as in the aforementioned steps S23 to S27 of FIG. 13, characteristics of a bullet object 72 such as type, attack power, and moving speed may be changed according to an input duration.

If the determination at S21 is "YES", then the CPU core 42 considers that an input of a direction is made and thus displays, at S31, an image of a tail 74 in adjacent to the bullet object 72 to express that the bullet object 72 is ready to be fired. Then, at S35, the CPU core 42 determines whether the touch input is over. If the determination at S35 is "NO", then the process returns to S31.

On the other hand, if the determination at S35 is "YES", i.e., a transition to a touch-off state occurs, then at S39 the CPU core 42 reads input coordinates detected immediately before the touch-off from the touch input history storage region 106 and stores the input coordinates in the last-touch-input coordinate storage region 110. Then, at S43, the CPU core 42 starts a bullet object movement process. The operation of the bullet object movement process according to this another embodiment will be described in detail in FIG. 18 which will be described later. When the bullet object movement process starts, the process proceeds to S47.

At S47, the CPU core 42 determines whether the game is over. If the determination at S47 is "NO", then the process returns to S1. If the determination at S47 is "YES", then the CPU core 42 ends the game process.

Figure 18:
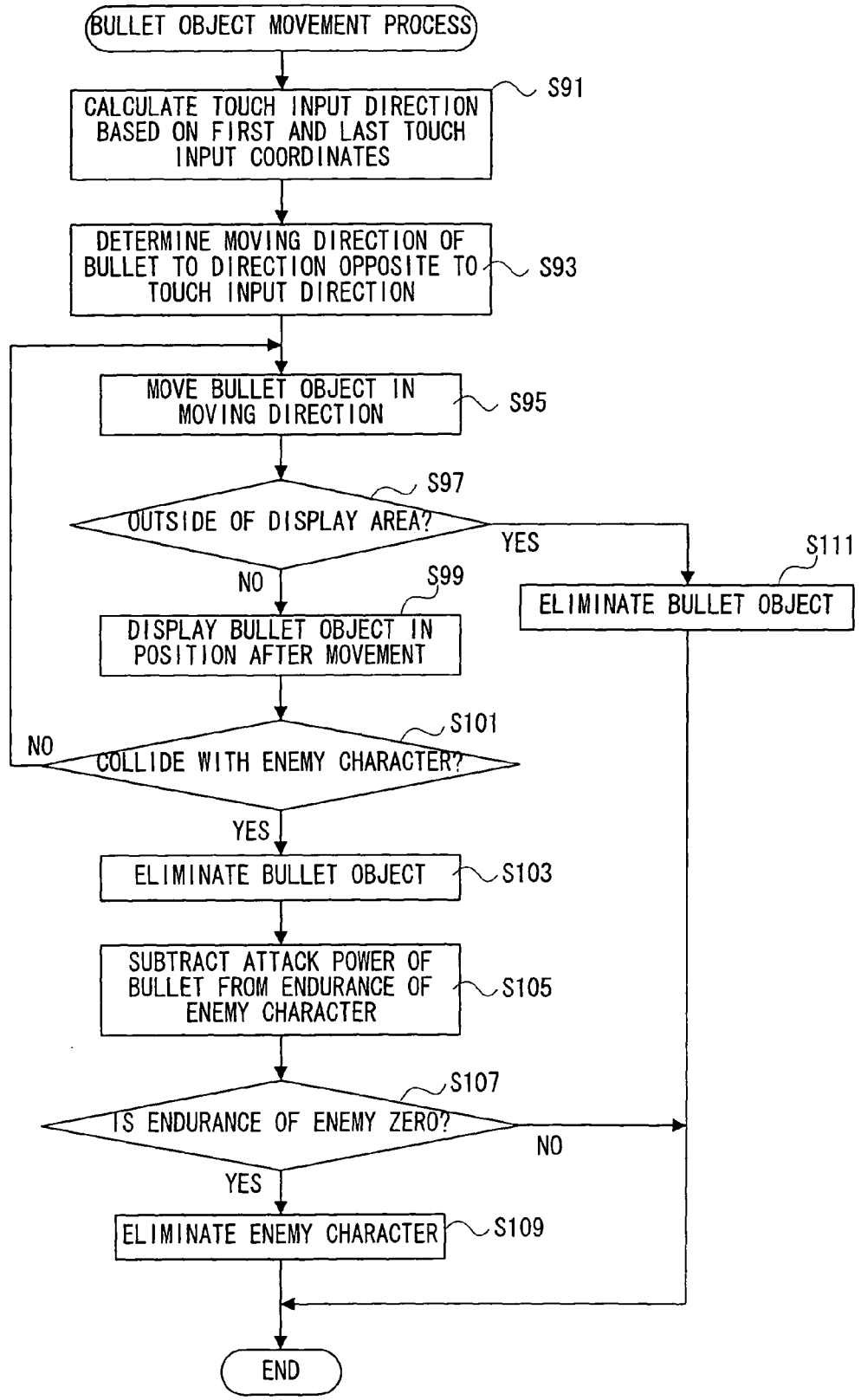
FIG. 18 is a flowchart showing an exemplary operation of a bullet object movement process of FIG. 17.

FIG. 18 shows an exemplary operation of the bullet object movement process which starts at S43 of FIG. 17. At a first S91 of FIG. 18, the CPU core 42 calculates a touch input direction based on the coordinates stored in the first-touch-input coordinate storage region 108 and the coordinates stored in the last-touch-input coordinate storage region 110. In the present embodiment, the calculated input direction is a direction that connects the first-touch-input coordinates with the last-touch-input coordinates.

Then, at S93, the CPU core 42 calculates the direction opposite to the input direction, determines the calculated direction as the moving direction of the bullet object 72, and stores, as moving direction data on the bullet object 72, the calculated direction in the bullet control data storage region 116.

Subsequently, at S95, the CPU core 42 moves the bullet object 72 in the moving direction. Specifically, the CPU core 42 calculates position coordinates after movement (position coordinates after one frame has elapsed), based on position coordinates, moving direction, and moving speed of the bullet object 72 which are stored in the bullet control data storage region 116.

Then, at S97, the CPU core 42 determines whether the position after movement is outside of a display area. If the determination at S97 is "NO", then at S99 the CPU core 42 displays, as in the aforementioned S65, the bullet object 72 at the position after movement. Subsequently, at S101, the CPU core 42 determines, as in the aforementioned S67, whether the bullet object 72 collides with an enemy character 70. If the determination at S101 is "NO", then the process returns to S95.

On the other hand, if the determination at S101 is "YES", then at S103 the CPU core 42 eliminates, as in the aforementioned S77, the bullet object 72 at a position where the collision with the enemy character 70 has occurred. Note that in this another embodiment it is premised that the attack power of the bullet object 72 is lower than or equal to the endurance of an enemy character 70, and thus when the bullet object 72 collides with an enemy character 70, the bullet object is always eliminated.

Subsequently, at S105, the CPU core 42 subtracts the attack power of the bullet object 72 from the endurance of the enemy character 70 to be collided and updates endurance data on the enemy character 70 to the calculated value.

At S107, the CPU core 42 determines whether the endurance of the enemy is zero. If the determination at S107 is "YES", then at S109 the CPU core 42 eliminates, as in the aforementioned S71, the enemy character 70 to be collided.

On the other hand, if the determination at S97 is "YES", i.e., the bullet object 72 is moved out of the display area without colliding with an enemy character 70, then at S111 the CPU core 42 eliminates, as in the aforementioned S77, the bullet object 72. When S109 or S111 is completed or when the determination at S107 is "NO", then the CPU core 42 ends the bullet object movement process.

According to the present embodiment, a bullet object 72 is generated in a start position of a touch input, an input direction is determined based on the object generation coordinates and coordinates continuously detected after the object generation coordinates, a moving direction of the bullet object 72 is determined based on the input direction, and the bullet object 72 is moved in the moving direction. As such, by a simple operation, a bullet object 72 can be generated in an arbitrary position and the bullet object 72 can be moved in an arbitrary direction with the position of the bullet object 72 being a starting point. Therefore, as in the aforementioned embodiment, the strategic characteristics of a shooting game or the like can be improved. Furthermore, by a simple, intuitive operation, multiple bullet objects 72 can be continuously generated and moved in desired directions, and thus a feeling of exhilaration can be obtained, providing a game that even beginners can easily enjoy.

Figure 19:
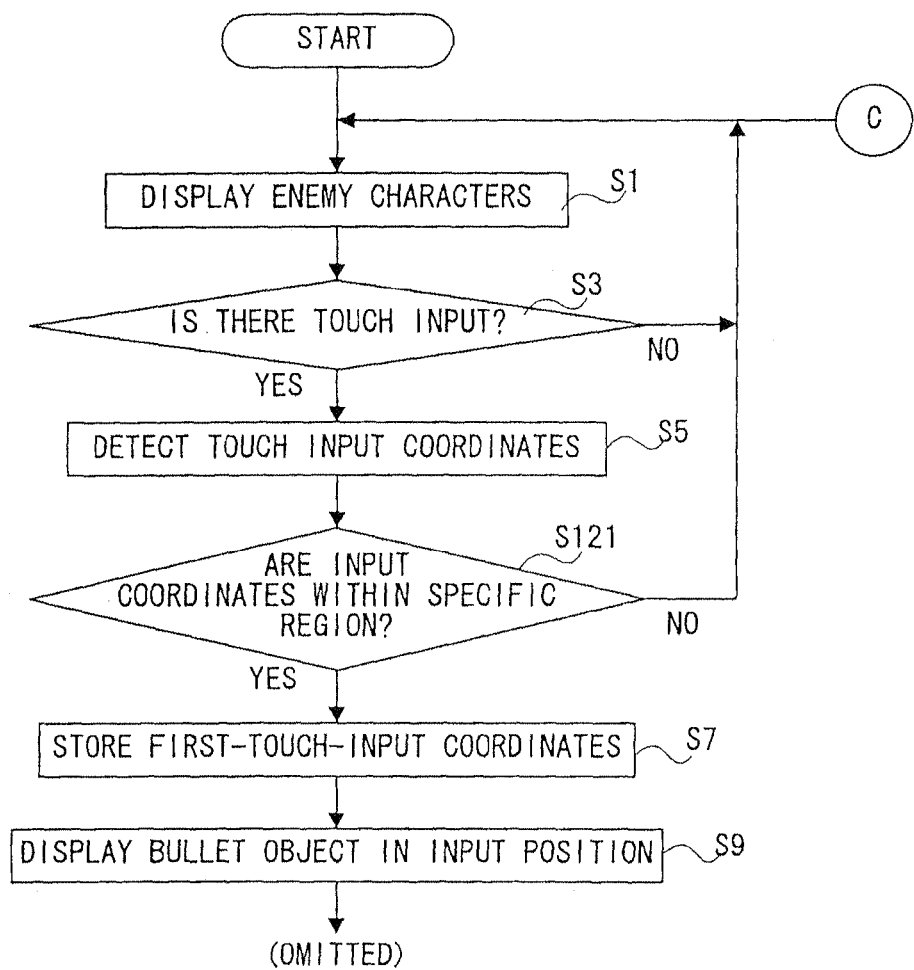
FIG. 19 is a flowchart showing part of an exemplary operation for the case in which an input position is considered as a bullet object generation condition.

Note that although in the aforementioned embodiments the first condition (condition for generating an object) is that there is a transition from a touch-off state to a touch-on state, in another embodiment the first condition may be that there is a transition from a touch-off state to a touch-on state and input coordinates detected upon the touch-on are within a specific region. Specifically, for example, as shown in FIG. 19, after the CPU core 42 detects, at S5, input coordinates upon the start of a touch input, the CPU core 42 determines, at S121, whether the input coordinates are within a specific region. Here, the specific region is a region where a bullet object 72 can be generated. For example, the specific region is not a region for displaying the score, map, etc., of the player but a region for displaying a game space or a game world. If the determination at S121 is "NO", then the CPU core 42 does not generate an object in response to the touch input and the process returns to S1. If the determination at S121 is "YES", then the process proceeds to S7, as in the embodiment of FIG. 13.

Figure 20:
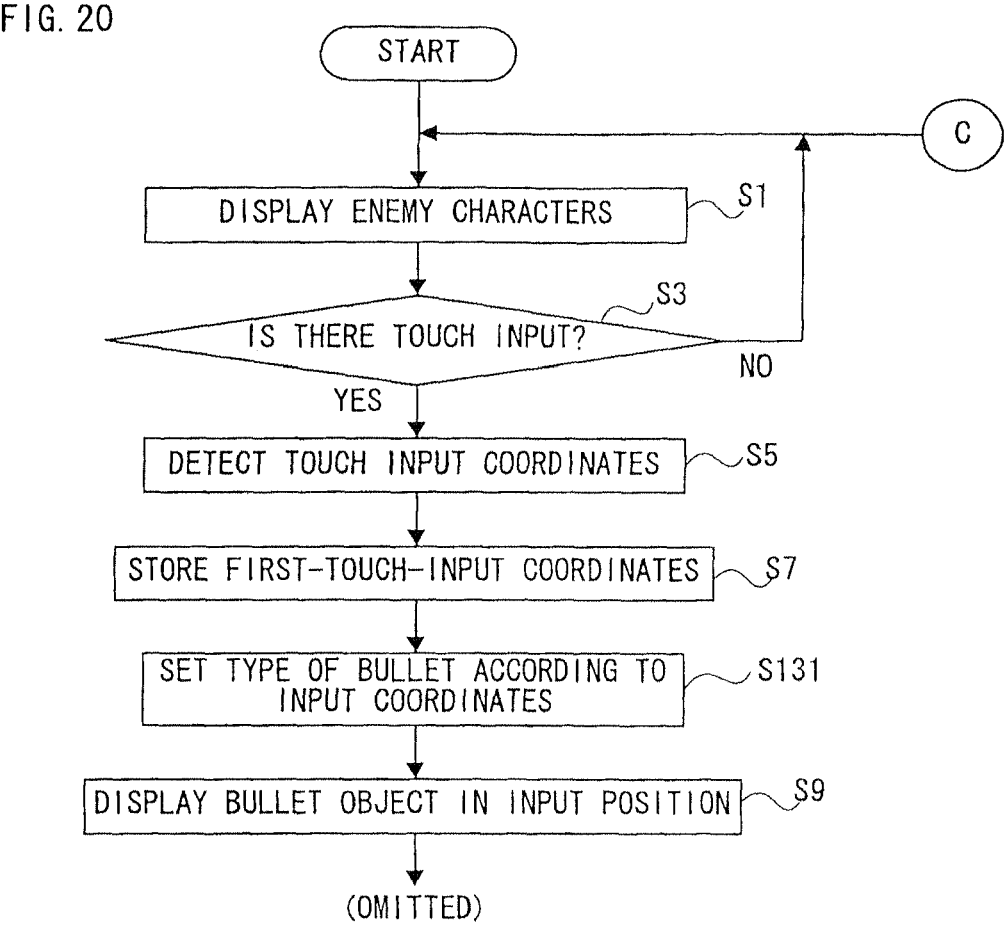
FIG. 20 is a flowchart showing part of an exemplary operation for the case in which the type of bullet object is set according to an object generation position.

In the aforementioned embodiments, as shown in FIG. 13, a time during which input coordinates detected after determined that the first condition is satisfied are continuously present within the predetermined region (certain distance range) from object generation coordinates is measured, and the characteristics, such as type, attack power, and moving speed of a bullet object 72 are set or changed according to the measured time. However, the characteristics such as type of a generated bullet object 72 may be set or changed according to input coordinates detected when the first condition is determined to be satisfied, i.e., object generation coordinates. For example, when the object generation coordinates are present on the upper side of the lower screen, the attack power and the moving speed may be set to lower values than those for a normal state, and when the object generation coordinates are present on the lower side of the lower screen, the attack power and the moving speed may be set to values for a power-up state. Specifically, for example, as shown in FIG. 20, when the CPU core 42 stores, at S7, the first-touch-input coordinates, the CPU core 42 then, at S131, sets the type of a bullet object 72 according to the first-touch-input coordinates. That is, characteristic data, such as type data, attack power data, and moving speed data, on the bullet object 72 which is stored in the bullet control data storage region 116 is set or changed to a value according to the object generation coordinates. Hence, since according to a value of object generation coordinates the attack power of the object is changed to a higher or lower level, a value to be subtracted from endurance which is indicated by endurance data on a collided enemy character 70 is changed to a larger or smaller value. When S131 is completed, then the process proceeds to S9, whereby an image of the bullet object 72 according to the set type is displayed.

Figure 21:
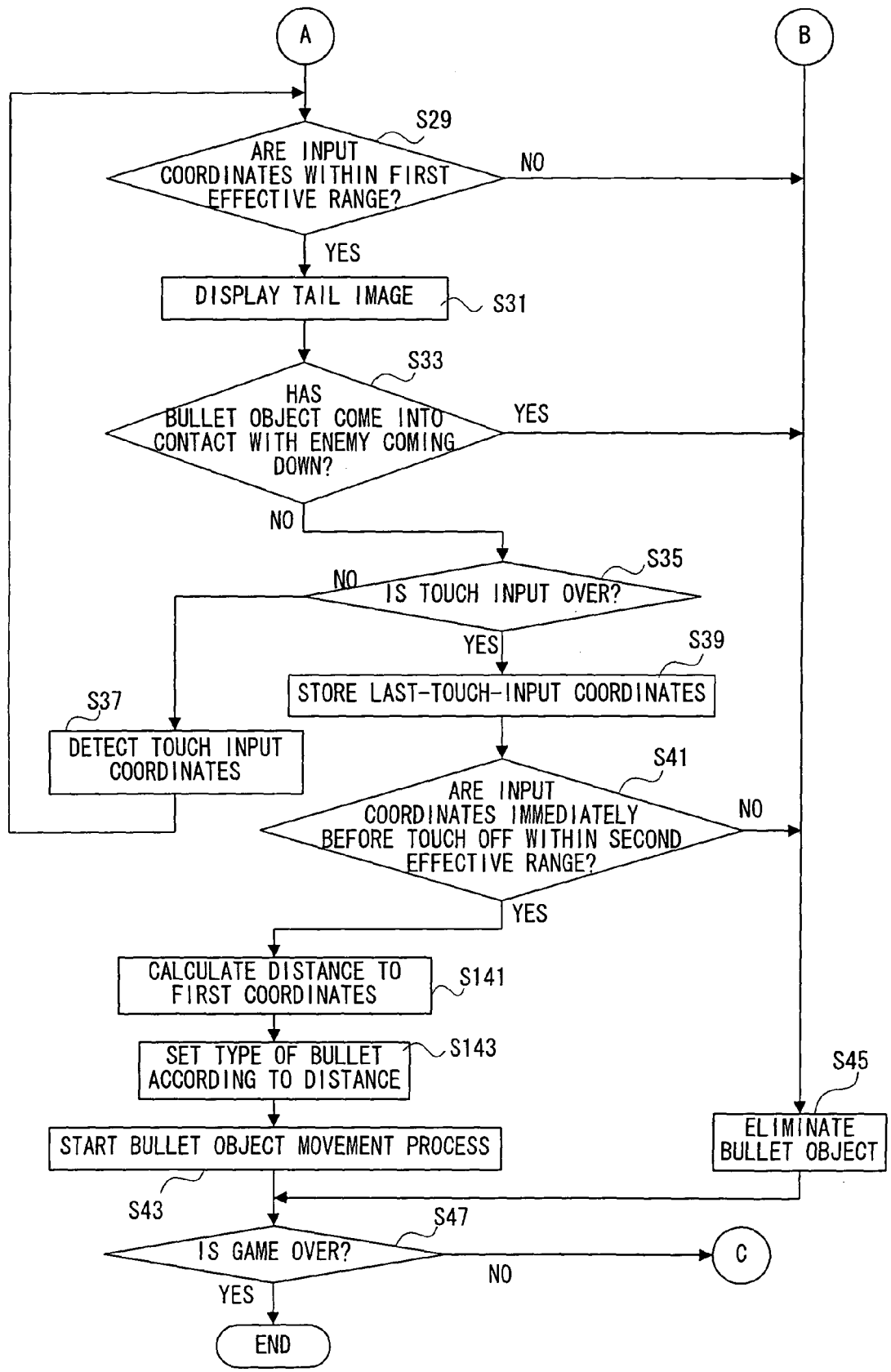
FIG. 21 is a flowchart showing part of an exemplary operation for the case in which the type of bullet object is set according to a distance between an input position detected when the bullet object movement condition is satisfied and an object generation position.

The characteristics, such as type, of a bullet object 72 may be set or changed according to a distance between object generation coordinates and coordinates detected when the second condition is determined to be satisfied. Specifically, for example, as show in FIG. 21, when the CPU core 42 determines at S41 that input coordinates detected immediately before a touch-off are within the second effective range, then the CPU core 42 calculates, at S141, a distance between the first-touch-input coordinates and the last-touch-input coordinates. Then, at S143, the CPU core 42 sets the type of a bullet object 72 according to the calculated distance and sets characteristic data, such as type data, attack power data, and moving speed data, on the bullet object 72 which is stored in the bullet control data storage region 116, to a value according to the distance. For example, when the distance is greater than or equal to a first predetermined threshold value, the attack power and the moving speed may be set to values for a power-up state, and when the distance is less than a second predetermined threshold value, the attack power and the moving speed may be set to values lower than those for a normal state. When S143 is completed, the process proceeds to S43. Hence, since the greater the distance from object generation coordinates the greater the attack power, a value to be subtracted from the endurance of a collided enemy character 70 becomes large. Note that in another embodiment the configuration may be such that the greater the distance from object generation coordinates the lower the power of a bullet object 72 so that the attack power and moving speed of the bullet object 72 are reduced.

In the aforementioned embodiments, when it is determined that the first condition is satisfied, a bullet object 72 is generated and displayed. However, in another embodiment, when it is determined that the condition (first condition) for generating a bullet object 72 is satisfied and the condition (second condition) for causing the bullet object 72 to move is satisfied, then the bullet object 72 may be generated and displayed in object generation coordinates and the bullet object 72 may be moved in the specific direction or a direction based on an input direction.

Figure 22:
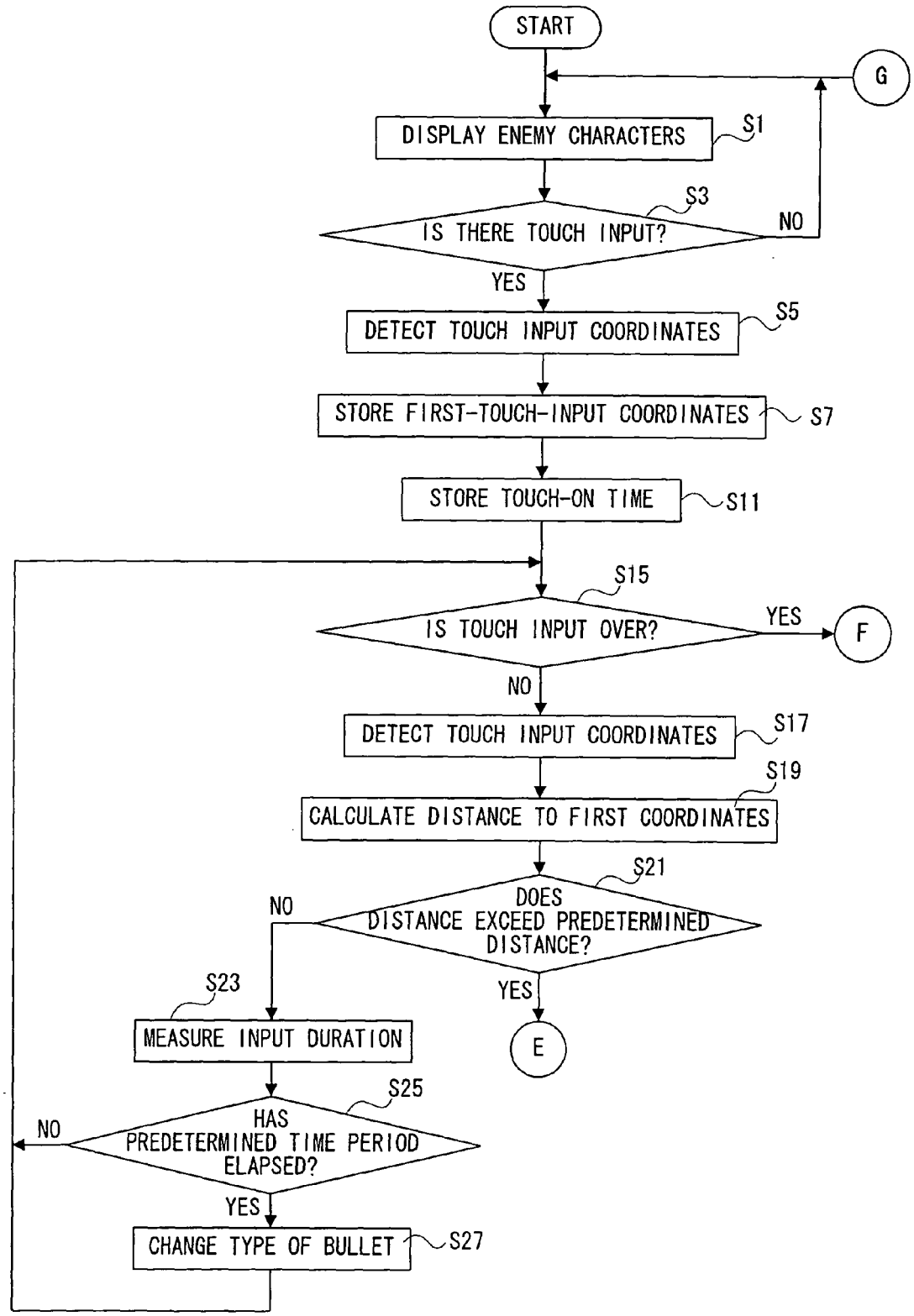
FIG. 22 is a flowchart showing part of an exemplary operation for the case in which a bullet object is generated and moved when the bullet object generation condition and movement condition are satisfied.
Figure 23:
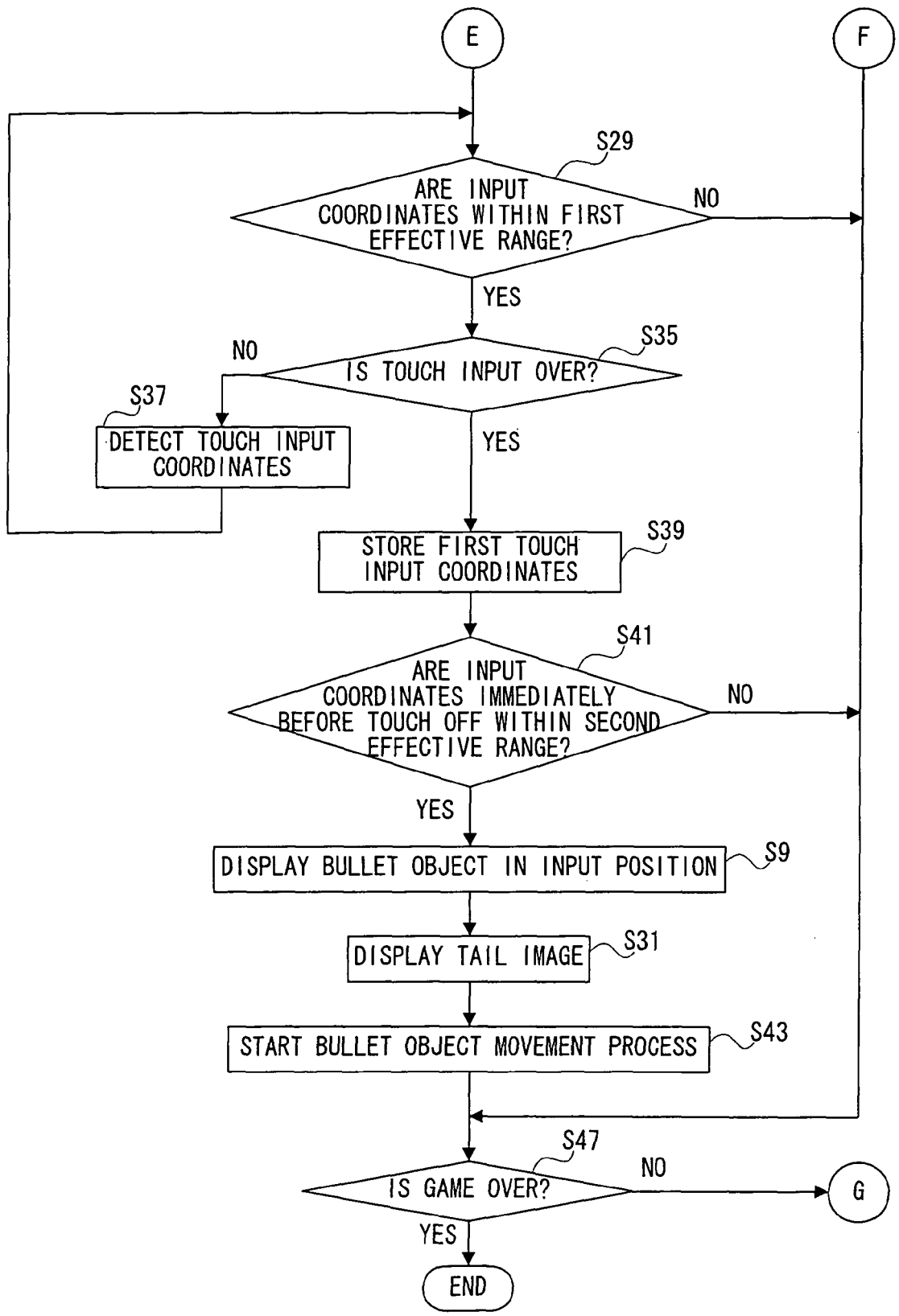
FIG. 23 is a flowchart continued from the flowchart of FIG. 22.

An exemplary operation according to this another embodiment is shown in FIGS. 22 and 23. Note that in FIGS. 22 and 23 the same or similar processing steps are denoted by the same or similar reference numerals as those in the aforementioned embodiment of FIGS. 13 and 14. Here, a detailed description of duplicate steps is omitted and part of the flow of an operation which is different from the aforementioned embodiment in terms of the generation and display timing of a bullet object 72 is simply described. At S7 of FIG. 22, the CPU core 42 stores the first-touch-input coordinates and then stores, at S11, a touch-on time. That is, even when object generation coordinates are determined, the CPU core 42 does not display a bullet object 72 at this timing. Thereafter, when it is determined at S41 of FIG. 23 that input coordinates detected immediately before a touch-off are within the second effective range, then the CPU core 42 displays, at S9, a bullet object 72 in the coordinates stored in the first-touch-input coordinate storage region 108. Then, at S31, the CPU core 42 displays an image of a tail 74. Note that an end position of the tail 74 may be set, for example, to the object generation coordinates or a little bit below the object generation coordinates. The CPU core 42 starts, at S43, a bullet object movement process and thus the bullet object 72 is moved in the specific direction or a direction based on an input direction.

In the aforementioned embodiments, the condition (first condition) for generating a bullet object 72 is that there is a transition from a touch-off state to a touch-on state. In another embodiment, however, the first condition may be that continuous touch input coordinates (coordinates to be detected when a touch-on continues) satisfy a predetermined condition. In this case, object generation coordinates can be determined while an input position is moved by sliding.

Figure 24:
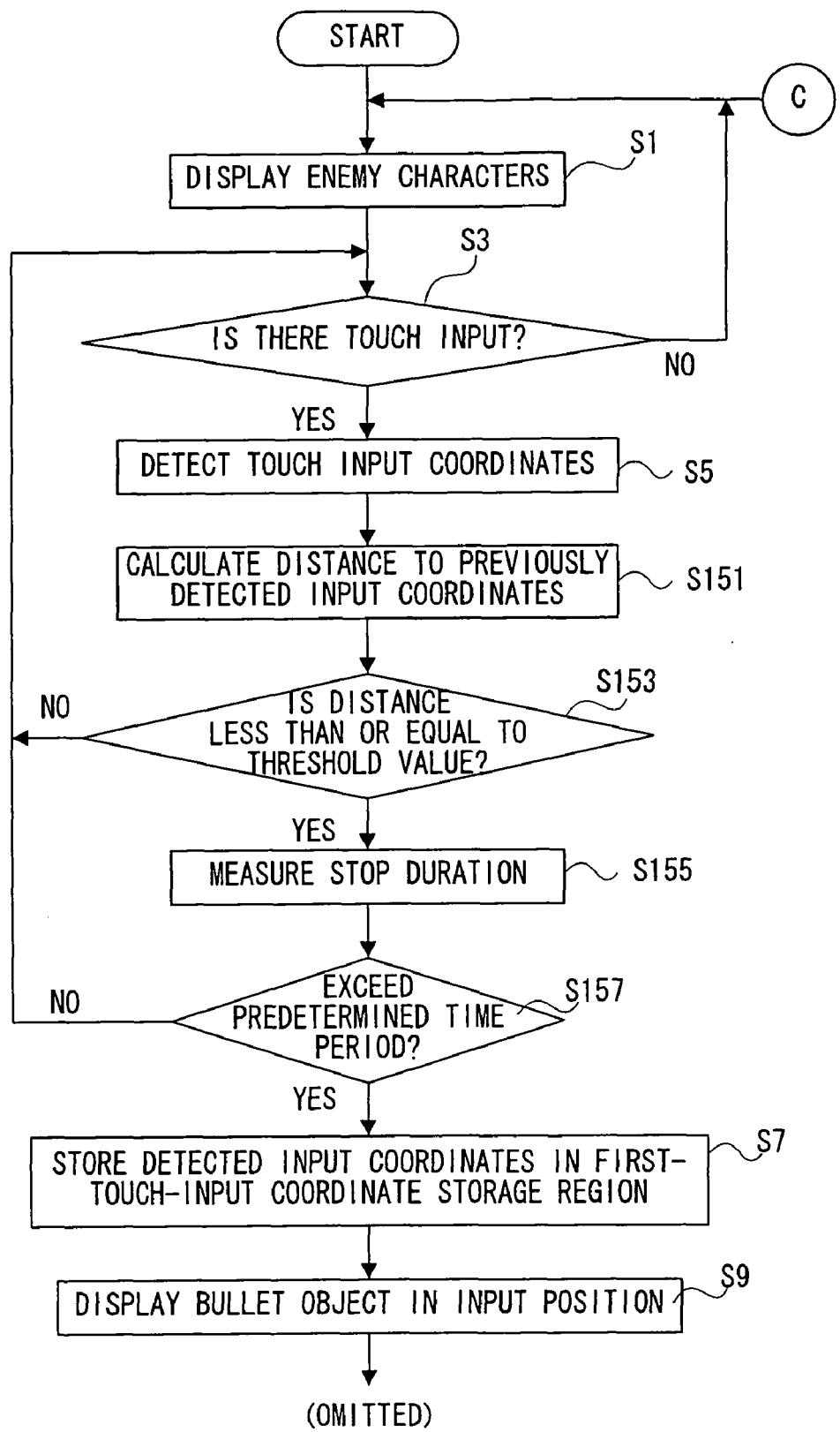
FIG. 24 is a flowchart showing part of an exemplary operation for the case in which a bullet object is generated under condition that an input position rests for a certain time period.

For example, in still another embodiment shown in FIG. 24, the first condition is that continuous touch input coordinates have stopped for a certain time period. When it is determined that the coordinates have stopped for the certain time period, then coordinates detected at that time are determined to be object generation coordinates. Specifically, as shown in FIG. 24, the CPU core 42 displays, at S1, enemy characters 70 on the LCD 12 and determines, at S3, whether there is a touch input. If the determination at S3 is "NO", then the process returns to S1. If the determination at S3 is "YES", then at S5 the CPU core 42 detects touch input coordinates and stores the input coordinates in the touch input history storage region 106.

Subsequently, at S151, the CPU core 42 calculates a distance between input coordinates previously detected when there is a continuous touch input and the currently detected input coordinates. Then, at S153, the CPU core 42 determines whether the calculated distance is less than or equal to a predetermined threshold value. The predetermined threshold value is set in advance to a value (the order of several dots) according to which an input position is considered to have stopped. If the determination at S153 is "NO", i.e., the input position is being moved, then the process returns to S3.

On the other hand, if the determination at S153 is "YES", i.e., the input position has stopped, then at S155 the CPU core 42 measures a stop duration. For example, the time at which the input position has started to stop is stored in the data storage region 82 and a stop duration is calculated based on the current time and the time at which the input position has started to stop. Then, at S157, the CPU core 42 determines whether the stop duration exceeds a certain time period. If the determination at S157 is "NO", then the process returns to S3.

If the determination at S157 is "YES", i.e., the input position has stopped for the certain time period, then at S7 the CPU core 42 stores, as object generation coordinates, the input coordinates detected at the S5 in the first-touch-input coordinate storage region 108. Then, at S9, the CPU core 42 displays a bullet object 72 in the detected input position.

In the embodiment of FIG. 24, the first condition is that when a touch input detection continues, the amount of change in detected coordinates is less than a threshold value and such a change continues for the certain time period. In another embodiment, however, the first condition may be that when a touch input continues, the amount of change in detected coordinates is greater than a threshold value and such a change continues for a certain time period. Alternatively, the first condition may be that when a touch input detection continues, detected coordinates do not change for a predetermined time period.

Figure 25:
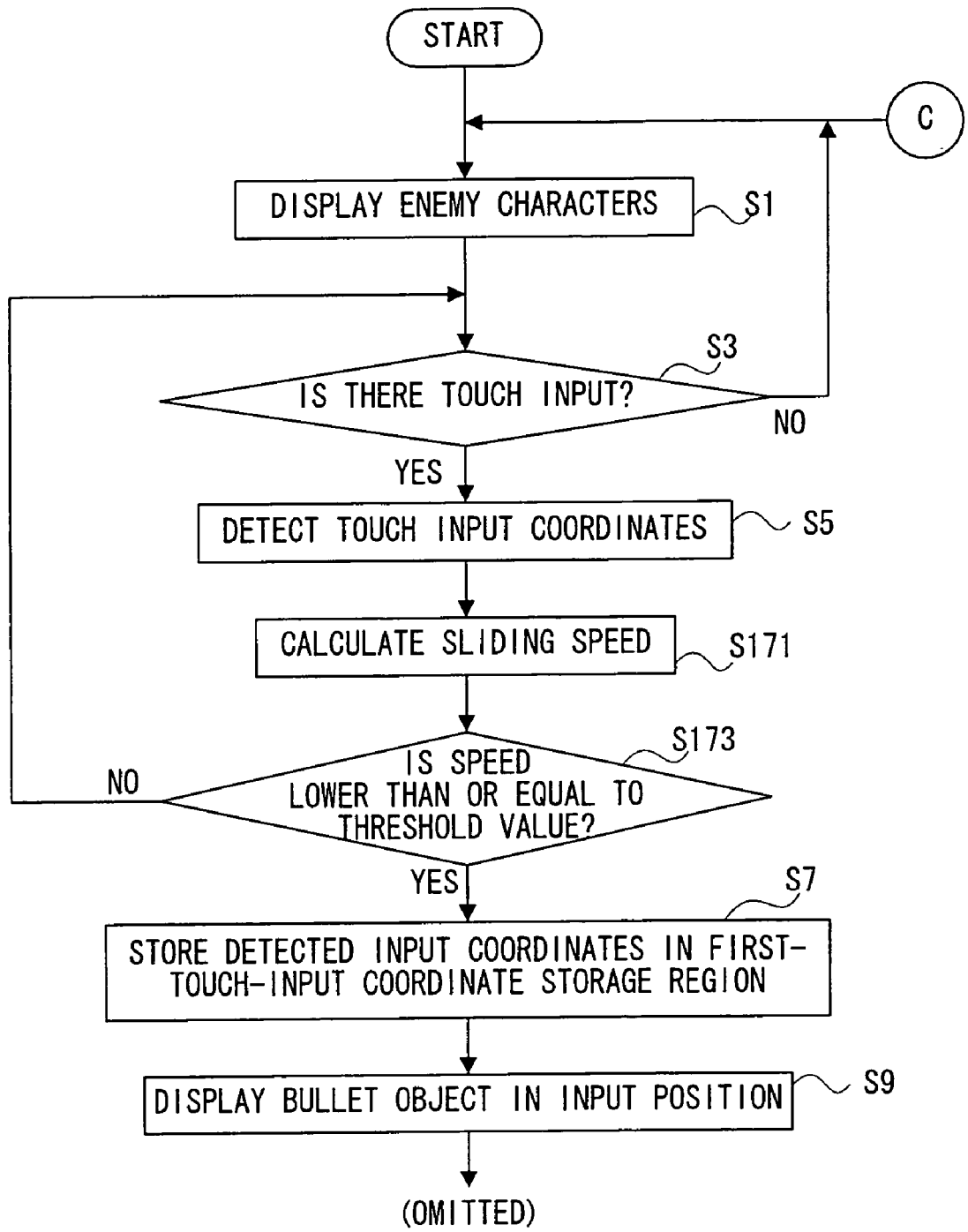
FIG. 25 is a flowchart showing part of an exemplary operation for the case in which a bullet object is generated under condition that a movement input speed is lower than or equal to a certain value.

For example, in another embodiment shown in FIG. 25, the first condition is that the sliding speed (movement input speed) of a continuous touch input is lower than or equal to a certain speed. When the speed of a sliding input is higher than the certain speed, it is considered that the player is still unable to determine a position where a bullet object 72 is to be generated. When the speed of a sliding input is lower than or equal to the certain speed, coordinates detected at that time are determined to be object generation coordinates. Specifically, as shown in FIG. 25, the CPU core 42 detects, at S5, touch input coordinates and then, at S171, calculates the sliding speed of the input. For example, since the touch input is detected at certain time intervals, in the case in which the touch input continues, a distance between previously detected coordinates and the currently detected coordinates is calculated and the calculated distance may be considered to be a speed. Then, at S173, the CPU core 42 determines whether the calculated speed is lower than or equal to a predetermined threshold value. If the determination at S173 is "NO", then the process returns to S3.

On the other hand, if the determination at S173 is "YES", i.e., the speed of the sliding input is lower than or equal to the certain speed, then at S7 the CPU core 42 stores, as object generation coordinates, the input coordinates detected at S5 in the first-touch-input coordinate storage region 108. Then, at S9, the CPU core 42 displays a bullet object 72 in the object generation coordinates.

In the aforementioned embodiments, when both of the object generation condition (first condition) and the object movement condition (second condition) are satisfied, a bullet object 72 is generated and moved. However, in another embodiment, when, during a time period from when the object generation condition is satisfied until the object movement condition is satisfied, the object generation condition is further satisfied, a second bullet object 72, which is different from a first bullet object 72 generated in coordinates which are detected when the object generation condition which is the first one is satisfied, may be generated in coordinates which are detected when the object generation condition which is the second one is satisfied. In this case, a plurality of objects 72 can be generated one after another and then the plurality of objects 72 can be moved.

Figure 26:
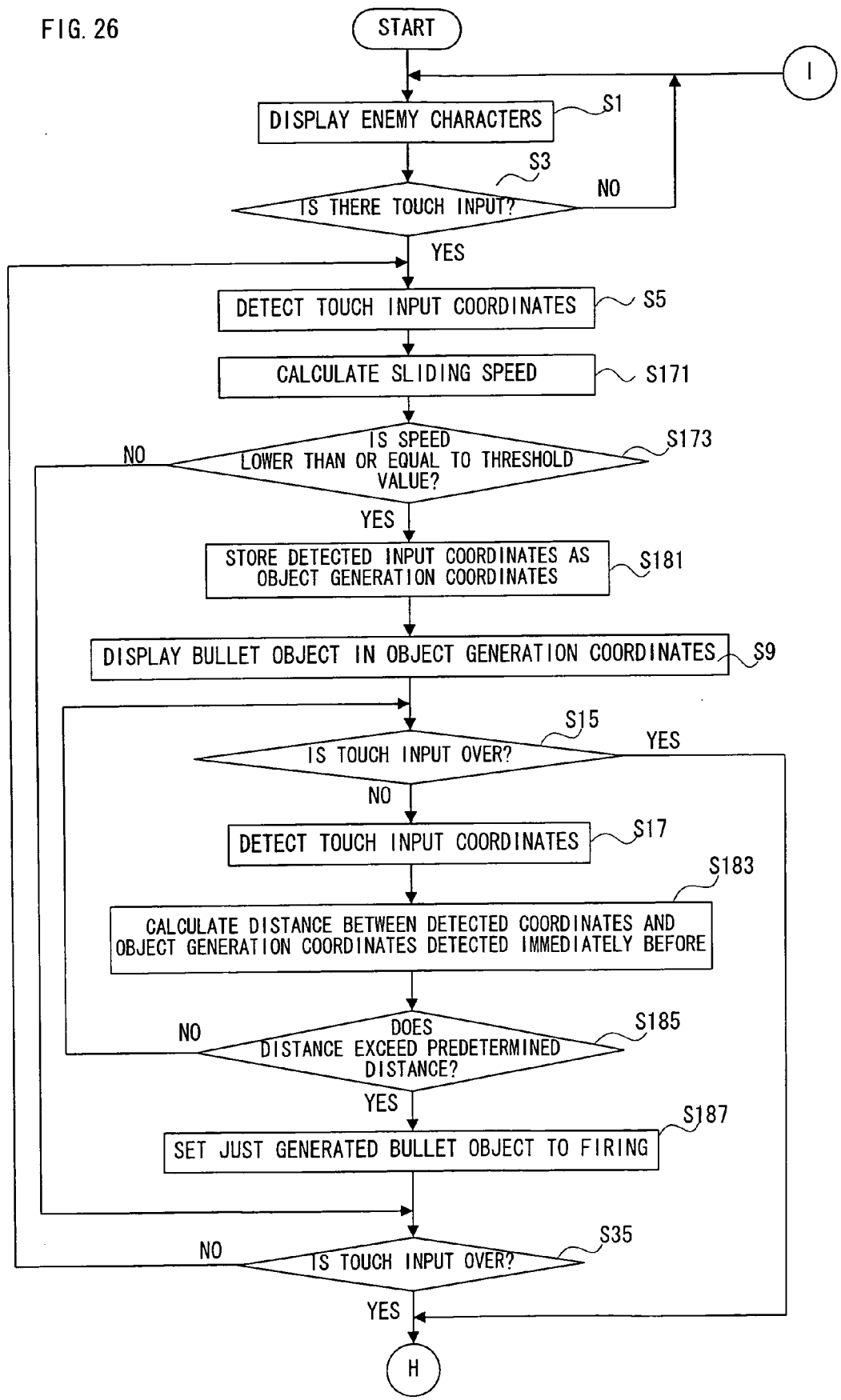
FIG. 26 is a flowchart showing part of an exemplary operation for the case in which, when, before the bullet object movement condition is satisfied, the bullet object generation condition is satisfied again, another bullet object is generated.
Figure 27:
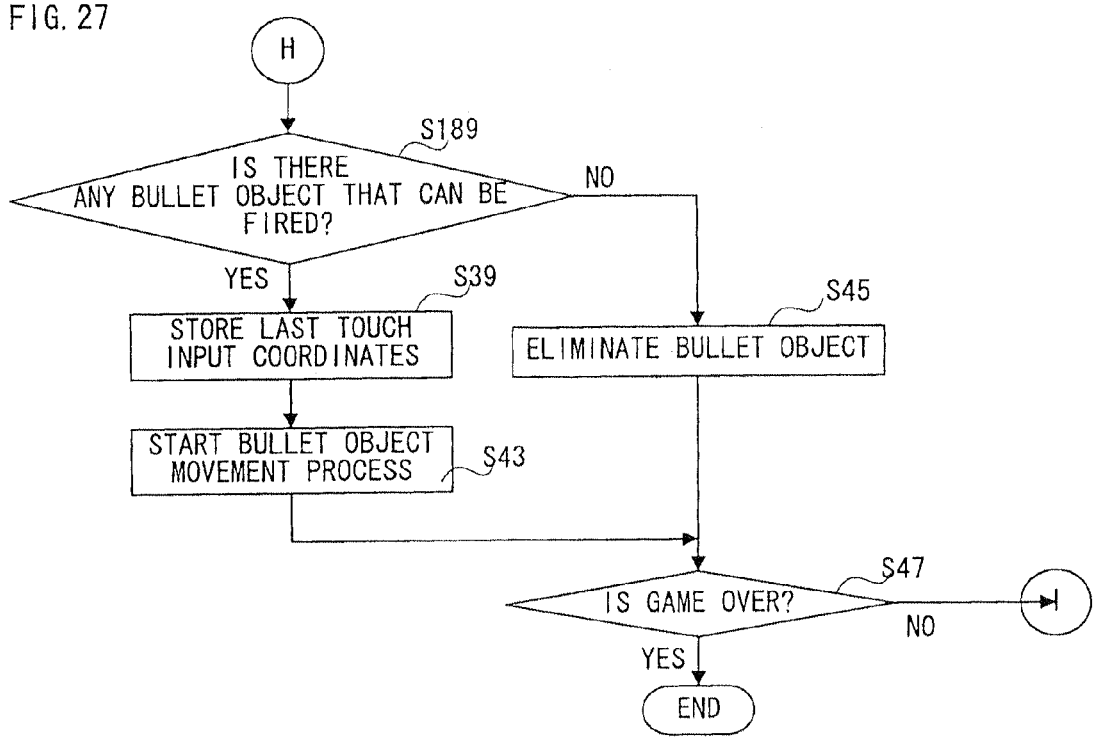
FIG. 27 is a flowchart continued from the flowchart of FIG. 26.

For example, in an embodiment shown in FIGS. 26 and 27, the first condition is that, as in the embodiment of FIG. 25, the movement speed of a continuous touch input is lower than or equal to a certain value. The second condition is that input coordinates are moved by a certain distance from object generation coordinates and then a transition to a touch-off state occurs. Note that, in the present embodiment too, the same or similar processing steps are denoted by the same or similar reference numerals as those in the aforementioned embodiments and a detailed description of duplicate steps is omitted.

The CPU core 42 detects, at S5 of FIG. 26, touch input coordinates and then, at S171, calculates the sliding speed of the input. The CPU core 42 determines, at S173, whether the calculated speed is lower than or equal to a predetermined threshold value. If the determination at S173 is "NO", then the process proceeds to S35.

On the other hand, if the determination at S173 is "YES", i.e., the object generation condition is satisfied, then at S181 the CPU core 42 stores the input coordinates detected at S5 in the bullet control data storage region 116, as object generation coordinates of a bullet object 72 to be generated. Then, at S9, the CPU core 42 displays a bullet object 72 in the generation coordinates.

The CPU core 42, at S15, determines whether the touch input is over. If the determination at S15 is "NO", i.e., the touch input continues, then at S17 the CPU core 42 detects touch input coordinates. Then, at S183, the CPU core 42 calculates a distance between the object generation coordinates detected immediately before and the detected coordinates. At S185, the CPU core 42 determines whether the calculated distance exceeds a certain distance. If the determination at S185 is "NO", then the process returns to S15.

On the other hand, if the determination at S185 is "YES", then at S187 the CPU core 42 sets data (contained in bullet control data) which indicates whether firing is enable, on the bullet object 72 just generated, to firing.

Subsequently, at S35, the CPU core 42 determines whether the touch input is over. If the determination at S35 is "NO", i.e., the touch input continues, then the process returns to S5. Thus, when the sliding speed becomes lower than or equal to the certain speed again, another bullet object 72 is generated in detected coordinates.

On the other hand, if the determination at S35 is "YES" or if the determination at S15 is "YES", then the process proceeds to a subsequent S189 of FIG. 27.

At S189 of FIG. 27, the CPU core 42 determines whether there is any bullet object 72 that can be fired, based on, for example, data which is contained in bullet control data on each bullet object 72 and which indicates whether firing is enabled. If the determination at S189 is "YES", i.e., the object movement condition is satisfied, then at S39 the CPU core 42 stores coordinates detected at that time in the last-touch-input coordinate storage region 110. Then, at S43, the CPU core 42 starts a bullet object movement process and the process proceeds to S47. In the bullet object movement process, the moving direction of the bullet object 72 may be the specific direction, as in the case of FIG. 15, or may be a direction based on an input direction, as in the case of FIG. 18.

On the other hand, if the determination at S189 is "NO", i.e., the movement condition is not satisfied, then at S45 the CPU core 42 eliminates the bullet object 72. Note that when a bullet object 72 is not generated, then the process proceeds to S47.

At S47, the CPU core 42 determines whether the game is over. If the determination at S47 is "NO", then the process returns to S1, and when the determination at S47 is "YES", then the CPU core 42 ends the game process.

Although the aforementioned embodiments describe the information processing apparatus 10 in which a shooting game in which a bullet object 72 is generated and moved to attack an enemy character 70 is performed, the type of game or application to be executed by the information processing apparatus 10 can be appropriately changed.

In addition, in the aforementioned embodiments, coordinates are inputted on the touch panel 22 provided on the screen of the LCD 14. However, such an input can be any devices as long as the devices can instruct a position (coordinates) on the screen; therefore, in another embodiment, for example, other pointing devices such as a trackpad and a tablet may be used. In the case of using a mouse, by displaying the mouse pointer on the display screen, an input position is specified. A state in which a mouse button is being pressed is considered to be a touch-on state, and a state in which the mouse button is released is considered to be a touch-off state. By this, a determination as to whether there is an input can be made by a pointing device.

Although in the aforementioned embodiments the first LCD 12 and the second LCD 14 are arranged vertically, the arrangement of the two LCDs can be appropriately changed. For example, in a game machine 10 according to another embodiment, a first LCD 12 and a second LCD 14 may be arranged horizontally.

In addition, although in the aforementioned embodiments two LCDs which display two game screens, respectively, are provided, the number of LCDs as a display can be appropriately changed. For example, in a game machine 10 according to another embodiment, a single vertical format LCD may be provided and its display area may be divided into upper and lower areas on which two game screens may be displayed, respectively. Alternatively, a single horizontal format LCD may be provided and its display area may be divided into left and right areas on which two game screens may be displayed, respectively.

Although the present invention has been described and illustrated in detail, it should be clearly understood that the description is by way of illustration and example only and that the invention is not limited thereto. The spirit and scope of the present invention are limited only by the terms of the appended claims.

The invention claimed is:

1. A non-transitory storage medium having an object control program of an information processing apparatus that displays on a display an object to be generated and moved according to an input from an input, wherein
the object control program causes a processor of the information processing apparatus to perform:
detecting coordinates inputted from the input;
determining whether a first condition is satisfied, based on a detection result obtained wherein the first condition is a transition from a state in which there is no detection to a state in which there is detection;
determining, as object generation coordinates, coordinates detected when the first condition is determined to be satisfied;
generating the object in the determined object generation coordinates; controlling a movement of the object based on continuous detection results after the object generation coordinates;
determining whether a second condition satisfied, based on at least one set of coordinates which are continuously detected after the first condition is determined to be satisfied, wherein the second condition is a transition from the state in which there is detection to a state in which there is no detection; and
starting movement of the generated object when the second condition is determined to be satisfied.

2. A non-transitory storage medium storing an object control program according to claim 1, wherein a parameter for the movement of the object is determined based on at least one set of the coordinates which are continuously detected.

3. A non-transitory storage medium storing an object control program according to claim 1, further comprising determining whether the coordinates detected while continuous detection is performed after the object generation coordinates satisfy a third condition, and
controlling the movement of the object when the third condition is determined to be satisfied.

4. A non-transitory storage medium storing an object control program according to claim 3, wherein it is determined whether the coordinates detected while continuous detection is performed after the object generation coordinates are a predetermined distance from the object generation coordinates.

5. A non-transitory storage medium storing an object control program according to claim 1, wherein, when the continuous detection results obtained after the object generation coordinates satisfy the second condition, the generated object is moved in a certain direction.

6. A non-transitory storage medium storing an object control program according to claim 5, wherein in the second determination, it is determined whether coordinates which satisfy the second condition and are detected while continuous detection is performed succeeding to the object generation coordinates after the first condition is determined to be satisfied in the first determination are present in a direction of a predetermined range having, as a center, the same direction as or a direction opposite to the certain direction from the object generation coordinates.

7. A non-transitory storage medium storing an object control program according to claim 1, wherein
the object control program causes the processor to further perform:
determining whether the coordinates detected while continuous detection is performed after the object generation coordinates satisfy a third condition; and
eliminating the object generated when the third condition is determined to be satisfied.

8. A non-transitory storage medium storing an object control program according to claim 7, wherein, as the third condition, a fact is determined that before the coordinates go outside of a first region which is provided with respect to the object generation coordinates, detection is over, the coordinates being detected while continuous detection is performed after the object generation coordinates.

9. A non-transitory storage medium storing an object control program according to claim 7, wherein, as the third condition, a fact is determined that the coordinates go outside of a first region which is provided with respect to the object generation coordinates, the coordinates being detected while continuous detection is performed after the object generation coordinates.

10. A non-transitory storage medium storing an object control program according to claim 9, wherein, in a case that detection is over after the continuous detection, when the coordinates detected immediately before the detection is over are within a second region which is provided with respect to the object generation coordinates different from the object generation coordinates for the first region, the movement of the object generated starts.

11. A non-transitory storage medium storing an object control program according to claim 10, wherein the first region is present in all directions of the object generation coordinates, and the second region is present only in a predetermined direction of the object generation coordinates.

12. A non-transitory storage medium storing an object control program according to claim 1, wherein
the second condition includes that an input direction is a predetermined direction, the input direction being based on the object generation coordinates and at least one set of coordinates which are continuously detected after the object generation coordinates, and the object is moved when the second condition is determined to be satisfied.

13. A non-transitory storage medium storing an object control program according to claim 12, wherein the input is for detecting coordinates on the display, and the predetermined direction in the second condition is the same direction as or a direction opposite to a moving direction of the object.

14. A non-transitory storage medium storing an object control program according to claim 13, wherein the predetermined direction is a direction having a positive component of a first direction, and the moving direction of the object is a direction opposite to the first direction.

15. A non-transitory storage medium storing an object control program according to claim 13, wherein the predetermined direction falls within a range of less than 90 degrees centering a first direction, and the moving direction of the object is a direction opposite to the first direction.

16. A non-transitory storage medium storing an object control program according to claim 1, further comprising:

determining an input direction by the input, based on the object generation coordinates and at least one set of coordinates which are continuously detected after the object generation coordinates; and determining a moving direction of the object based on the determined input direction, and when the second condition is determined to be satisfied, the object is moved in the determined moving direction.

17. A non-transitory storage medium storing an object control program according to claim 16, wherein a direction that connects the object generation coordinates with detected coordinates when the second condition is determined to be satisfied is determined to be the input direction.

18. A non-transitory storage medium storing an object control program according to claim 16, wherein a reversed direction from the input direction is determined to be the moving direction of the object.

19. A non-transitory storage medium storing an object control program according to claim 16, wherein, based on detected coordinates detected during a time period from when the first condition is determined to be satisfied until when the second condition is determined to be satisfied, the input direction for each time period is determined, a moving direction of the object for each time period is determined based on the input direction for each time period, the objects different from each other for each time period are generated for each object generation coordinates, and each object is moved in each moving direction determined for each time period.

20. A non-transitory storage medium storing an object control program according to claim 1, wherein different objects are generated for different determinations in the object generation coordinate determination.

21. A non-transitory storage medium storing an object control program according to claim 1, wherein a second object is generated when the second condition is determined to be satisfied in the second determination.

22. A non-transitory storage medium storing an object control program according to claim 1, wherein, when, during a time period from when the first condition is determined to be satisfied in the first determination until when the second condition is determined to be satisfied in the second determination, it is further determined in the first determination that the first condition is satisfied, a first object is generated in the object generation coordinates which are determined when the first condition is determined to be satisfied, and a second object is generated in the object generation coordinates which are determined when the first condition is determined to be satisfied, the second object being different from the first object.

23. A non-transitory storage medium storing an object control program according to claim 1, wherein the object control program causes the processor to measure a time during which coordinates detected in the detection are continuously present within a predetermined region from the object generation coordinates, after the first condition is determined to be satisfied in the first determination, and the object control includes setting at least one type data parameter of the object and a movement parameter of the object, according to the time measured.

24. A non-transitory storage medium storing an object control program according to claim 1, wherein the object control program causes the processor to calculate a distance between the object generation coordinates and coordinates detected in the detection when the second condition is determined to be satisfied in the second determination, and the object control includes setting at least one type data parameter of the object and a movement parameter of the object, according to the distance calculated in the distance calculation.

25. A non-transitory storage medium storing an object control program according to claim 1, wherein the object control includes setting at least one type data parameter of the object and a movement parameter of the object, according to the determined object generation coordinates.

26. A non-transitory storage medium storing an object control program according to claim 1, wherein the object control program causes the processor to further perform:

controlling generation and movement of a shooting target object;

determining whether there is a collision between the object and the shooting target object; and eliminating the shooting target object when it is determined that the object has collided with the shooting target object.

27. A non-transitory storage medium storing an object control program according to claim 26, further comprising setting endurance data for each shooting target object, and subtracting, when it is determined in the collision determination that the object has collided with the shooting target object, endurance indicated by the endurance data on the shooting target object, and the shooting target object is eliminated when the endurance after the subtraction becomes lower than or equal to a predetermined threshold value.

28. A non-transitory storage medium storing an object control program according to claim 27, further comprising measuring, for each object, a time during which, after the first condition is determined to be satisfied, detected coordinates are continuously present within a predetermined region from the object generation coordinates, wherein the longer the time measured in the time measurement for the object having collided with the shooting target object, the larger a value to be subtracted from the endurance data on the shooting target object.

29. A non-transitory storage medium storing an object control program according to claim 27, wherein
the object control program causes the processor to further perform calculating, for each object, a distance between the object generation coordinates and coordinates detected when the second condition is determined to be satisfied, wherein
the longer the distance calculated in the distance calculation for the object having collided with the shooting target object, the larger a value to be subtracted from the endurance data on the shooting target object.

30. A non-transitory storage medium storing an object control program according to claim 27, wherein, according to the object generation coordinates of the object having collided with the shooting target object, a value to be subtracted from the endurance data on the shooting target object is changed.

31. A non-transitory storage medium storing an object control program according to claim 1, wherein the input includes a touch panel placed over a display screen of the display.

32. A non-transitory storage medium storing an object control program of an information processing apparatus that displays on a display an object to be generated and moved according to an input from an input, wherein
the object control program causes a processor of the information processing apparatus to perform:
detecting coordinates inputted from the input;
determining whether a first condition is satisfied, based on a detection result, wherein the first condition is a transition from a state in which there is no detection to a state in which there is detection;
determining, as object generation coordinates, coordinates detected when the first condition is determined to be satisfied;
generating the object in the object generation coordinates determined;
determining whether the coordinates detected while continuous detection is performed in the detection after the object generation coordinates are outside of a first region which is provided with respect to the object generation coordinates;
starting a movement of the object generated, when detection transitions from a state in which there is detection to a state in which there is no detection after the coordinates detected during the continuous detection are determined to be outside of the first region in the outside-of-region determination; and
eliminating the object generated, when detection is over before the coordinates detected during the continuous detection are determined to be outside of the first region in the outside-of-region determination.

33. An information processing apparatus that displays on a display an object to be generated and moved according to an input from an input, comprising:
a processor;
a memory coupled to said processor, said memory storing instructions that, when executed by said processor, control said processor to:
detect coordinates inputted from the input;
determine whether a first condition is satisfied, based on a detection result, wherein the first condition is a transition from a state in which there is no detection to a state in which there is detection;
determine, as object generation coordinates, coordinates detected when the first condition is determined to be satisfied;
generate the object in the determined object generation coordinates;
control a movement of the object based on continuous detection results after the object generation coordinates;
determine whether a second condition, which is a transition from a state in which there is detection to a state in which there is no detection, is satisfied, based on at least one set of coordinates which are continuously detected after the first condition is determined to be satisfied; and
start movement of the generated object when the second condition is determined to be satisfied.

34. An information processing apparatus that displays on a display an object to be generated and moved according to an input from an input, comprising;
detection programmed logic circuitry for detecting coordinates inputted from the input;
first determination programmed logic circuitry for determining whether a first condition is satisfied, based on a detection result obtained by the detection programmed logic circuitry, wherein the first condition is a transition from a state in which there is no detection to a state in which there is detection;
generation coordinate determination programmed logic circuitry for determining, as object generation coordinates, coordinates detected by the detection programmed logic circuitry when the first condition is determined to be satisfied by the first determination programmed logic circuitry;
object generation programmed logic circuitry for generating the object in the object generation coordinates determined by the generation coordinate determination programmed logic circuitry;
outside-of-region determination programmed logic circuitry for determining whether the coordinates detected by the detection programmed logic circuitry while continuous detection is performed by the detection programmed logic circuitry after the object generation coordinates are outside of a first region which is provided with respect to the object generation coordinates;
object control programmed logic circuitry for starting a movement of the object generated by the object generation programmed logic circuitry, when detection by the detection programmed logic circuitry transitions from a state in which there is detection to a state in which there is no detection after the coordinates detected during the continuous detection are determined to be outside of the first region by the outside-of-region determination programmed logic circuitry; and
object elimination programmed logic circuitry for eliminating the object generated by the object generation programmed logic circuitry, when detection by the detection programmed logic circuitry is over before the coordinates detected during the continuous detection are determined to be outside of the first region by the outside-of-region determination programmed logic circuitry.

35. A method of controlling at least one information processing apparatus that displays on a display an object to be generated and moved according to an input from an input, the method comprising:
detecting coordinates inputted from the input;
determining whether a first condition is satisfied, based on a detection result obtained, wherein the first condition is a transition from a state in which there is no detection to a state in which there is detection;

determining, as object generation coordinates, coordinates detected when the first condition is determined to be satisfied;

generating the object in the determined object generation coordinates;

controlling a movement of the object based on continuous detection results after the object generation coordinates;

determining whether a second condition, which is a transition from a state in which there is detection to a state in which there is no detection, is satisfied, based on at least one set of coordinates which are continuously detected after the first condition is determined to be satisfied; and starting movement of the generated object when the second condition is determined to be satisfied.

36. An information processing system that displays on a display an object to be generated and moved according to an input from an input, comprising:

a processor;

a detector configured to detect coordinates inputted from the input;

a first determiner configured to determine whether a first condition is satisfied, based on a detection result, wherein the first condition is a transition from a state in which there is no detection to a state in which there is detection;

a generation coordinate determiner configured to determine, as object generation coordinates, detected coordinates when the first condition is determined to be satisfied;

an object generator configured to generate the object in the determined object generation coordinates;

an object controller configured to control a movement of the object based on continuous detection results determined by said generation coordinate determiner after the object generation coordinates; and a second determiner configured to determine whether a second condition, wherein the second condition is a transition from a state in which there is detection to a state in which there is no detection, is satisfied, based on at least one set of coordinates which are continuously detected after the first condition is determined to be satisfied, wherein movement of the generated object begins when the second condition is determined to be satisfied.

37. A non-transitory storage medium having an object control program of an information processing apparatus that displays on a display an object to be generated and moved according to an input from an input, wherein the object control program causes a processor of the information processing apparatus to perform:

detecting coordinates inputted from the input;

determining whether a first condition is satisfied, based on a detection result obtained, wherein the first condition is one of a transition from a state in which there is no detection to a state in which there is detection, when a state in which there is detection continues and an amount of change in detected coordinates is less than or greater than a threshold value and that the detected coordinates do not change for a predetermined time period;

determining, as object generation coordinates, coordinates detected when the first condition is determined to be satisfied;

generating the object in the determined object generation coordinates; controlling a movement of the object based on continuous detection results after the object generation coordinates;

determining whether a second condition is satisfied, based on at least one set of coordinates which are continuously detected after the first condition is determined to be satisfied, wherein the second condition is one of a transition from the state in which there is detection to a state in which there is no detection, when a state in which there is detection continues and an amount of change in detected coordinates is less than or greater than a threshold value, that the detected coordinates do not change for a predetermined time period, and that coordinate detection continues which can be considered that input coordinates are distanced by a predetermined distance from coordinates detected when the first condition is satisfied or that detection of coordinates that can be regarded as inputs in a predetermined direction from the coordinates is continued; and starting movement of the generated object when the second condition is determined to be satisfied.

38. A non-transitory storage medium storing an object control program according to claim 37, wherein at least one of moving speed of the object, moving direction of the object and moving distance of the object is determined based on at least a single coordinate out of a plurality of coordinates continuously detected after the first condition is satisfied.

* * * * *